United States Patent
Kang et al.

(10) Patent No.: US 11,088,865 B2
(45) Date of Patent: Aug. 10, 2021

(54) SYSTEM, DEVICE AND METHOD FOR TERMINAL PRODUCT USABLE TIME MANAGEMENT

(71) Applicant: Dartpoint Tech. Co., Ltd., Taipei (TW)

(72) Inventors: Chi-Lin Kang, New Taipei (TW); Chao-Yuan Huang, Taipei (TW)

(73) Assignee: DARTPOINT TECH. CO., LTD., Taipei (TW)

( * ) Notice: Subject to any disclaimer, the term of this patent is extended or adjusted under 35 U.S.C. 154(b) by 85 days.

(21) Appl. No.: 16/051,614

(22) Filed: Aug. 1, 2018

(65) Prior Publication Data
US 2019/0044746 A1    Feb. 7, 2019

Related U.S. Application Data

(60) Provisional application No. 62/540,611, filed on Aug. 3, 2017.

(51) Int. Cl.
| H04L 12/28 | (2006.01) |
| H04L 29/08 | (2006.01) |
| G06Q 30/02 | (2012.01) |
| H04L 29/06 | (2006.01) |
| H04W 12/06 | (2021.01) |

(Continued)

(52) U.S. Cl.
CPC ........ *H04L 12/282* (2013.01); *G01R 19/0069* (2013.01); *G01R 19/2513* (2013.01); *G06Q 30/0284* (2013.01); *H04L 63/108* (2013.01); *H04L 67/12* (2013.01); *H04L 67/125* (2013.01); *H04W 12/06* (2013.01); *A61H 33/005* (2013.01); *A61H 33/0087* (2013.01); *A61H 33/028* (2013.01); *A61H 2033/0054* (2013.01); *A61H 2201/501* (2013.01); *A61H 2201/502* (2013.01);

(Continued)

(58) Field of Classification Search
CPC ..... H04L 12/282; H04L 67/12; H04L 63/108; H04L 63/0428; H04L 67/125; H04W 12/06; H04W 12/02; G01R 19/0069; G01R 19/2513; G06Q 30/0284; G06Q 20/308; A61H 33/005; A61H 2033/0054; A61H 33/028; A61H 33/0087; A61H 2201/501; A61H 2201/502; E04H 4/129
See application file for complete search history.

(56) References Cited

U.S. PATENT DOCUMENTS

2004/0117440 A1* 6/2004 Singer ............. H04N 21/43622
709/203

* cited by examiner

*Primary Examiner* — James J Yang
(74) *Attorney, Agent, or Firm* — Bacon & Thomas, PLLC

(57) ABSTRACT

A terminal product usable time management system includes a remote server and a local apparatus. The local apparatus includes a data memory storing an identifier and an encrypted usable time of the terminal product, a microprocessor used to send a start notification of a usable time management process, a product controller used to control a product load, and a wireless networking device used to communicate with the remote server to receive a new expiry date to update the usable time. The usable time management process includes: reading the encrypted usable time stored in the data memory, decrypting the encrypted usable time, decreasing the usable time per time unit, encrypting the decreased usable time, storing the encrypted and decreased usable time into the data memory, and instructing the product controller to disable some or all functions of the terminal product, if the usable time is inaccessible or decreased to zero.

10 Claims, 15 Drawing Sheets

(51) Int. Cl.
  *G01R 19/00* (2006.01)
  *G01R 19/25* (2006.01)
  *A61H 33/02* (2006.01)
  *E04H 4/12* (2006.01)
  *H04W 12/02* (2009.01)
  *G06Q 20/30* (2012.01)
  *A61H 33/00* (2006.01)
(52) U.S. Cl.
  CPC ............ *E04H 4/129* (2013.01); *G06Q 20/308* (2020.05); *H04L 63/0428* (2013.01); *H04W 12/02* (2013.01)

(Encryption Process and Method for a Semi-Ciphertext Block)

SYSTEM, DEVICE AND METHOD FOR TERMINAL PRODUCT USABLE TIME MANAGEMENT

CROSS REFERENCE TO RELATED APPLICATION

This application claims the benefit of filing date of U. S. Provisional Application No. 62/540,611, entitled "Cable/wireless networking device and system configuration having functions of control instruction conversion and proxy measure analysis, and configuration (and method) of terminal product service time management" filed Aug. 3, 2017 under 35 USC § 119(e)(1).

BACKGROUND OF THE INVENTION

1. Field of the Invention

The present invention relates to system, device and method for terminal product usable time management.

2. Description of Related Art

The internet of thing (IoT) is the network of physical devices through wired or wireless communications. The realization of IoT makes it possible to search, control or manage vehicles, home appliances and other items by a central or remote computer.

The concept of IoT is also applicable to issuance of an electronic license for a terminal product. However, the terminal product may be cheated by a fake electronic license, or the terminal product may misrecognize an expired electronic license because of temporal disorder.

Moreover, the terminal product may not be always connected to the internet, so there may be a problem about how to manage the terminal product without the internet.

Therefore, it is desirable to provide an improved system, device and method for terminal product usable time management to mitigate and/or obviate the aforementioned problems.

SUMMARY OF THE INVENTION

According to an aspect of system, the present invention provides a terminal product usable time management system including a remote server and a local apparatus. The remote server includes a customer service software and a customer database. The local apparatus includes a data memory storing an identifier and an encrypted usable time or an encrypted expiry date of the terminal product, a microprocessor used to send a start notification of a usable time management process, a product controller used to control at least one product load, the product controller and the product load(s) being parts of the terminal product, and a wireless networking device used to communicate with the remote server, in order to receive a new expiry date to update the usable time or the expiry date. The usable time management process includes: reading the encrypted usable time or the encrypted expiry date stored in the data memory, decrypting the encrypted usable time or the encrypted expiry date, decreasing the usable time per time unit or comparing with the expiry date, encrypting the decreased usable time or the expiry date, storing the encrypted and decreased usable time or the encrypted expiry date into the data memory, and instructing the product controller to disable some or all functions of the terminal product, if the usable time is inaccessible or decreased to zero, or it reaches the expiry date. The customer service software of the remote server generates, encrypts and sends the new expiry date to the local apparatus.

According to an aspect of device, the present invention provides a terminal product usable time management device including a data memory storing an identifier and an encrypted usable time or an encrypted expiry date of the terminal product, a microprocessor used to execute a usable time management process, a product controller used to control at least one product load, the product controller and the product load(s) being parts of the terminal product, and at least one communication port used to connected to at least one external device, in order to receive a new expiry date for the microprocessor to update the usable time or the expiry date. The usable time management process includes: reading the encrypted usable time or the encrypted expiry date stored in the data memory, decrypting the encrypted usable time or the encrypted expiry date, decreasing the usable time per time unit or comparing with the expiry date, encrypting the decreased usable time or the expiry date, storing the encrypted and decreased usable time or the encrypted expiry date into the data memory, and instructing the product controller to disable some or all functions of the terminal product, if the usable time is inaccessible or decreased to zero, or it reaches the expiry date.

According to an aspect of method, the present invention provides a terminal product usable time management method, adapted to a terminal product usable time management device including a data memory, a microprocessor, and at least one communication port of a product controller. The method includes: using a customer service software of a remote server to generate, encrypt and send a new expiry date to the local apparatus, using the data memory to store an identifier and a usable time or an expiry date of the terminal product, connecting the at least one communication port to at least one external device, in order to receive a new expiry date to update the usable time or the expiry date, using the microprocessor to read the encrypted usable time or the encrypted expiry date stored in the data memory, decrypt the encrypted usable time or the encrypted expiry date, decrease the usable time per time unit or compare with the expiry date, encrypt the decreased usable time or the expiry date, store the encrypted and decreased usable time or the encrypted expiry date into the data memory, and instruct the product controller to disable some or all functions of the terminal product, if the usable time is inaccessible or decreased to zero, or it reaches the expiry date.

According to the present invention, the usable time is decreased with time, stored and protected in the data memory of the local apparatus. Some or all functions of the terminal product may be limited if the usable time expires. The present invention also provides a private semi-ciphertext algorithm to encrypt and decrypt the usable time for further use in the usable time management process, so that the usable time will not be extend by modifying the real time clock (RTC).

Other objects, advantages, and novel features of the invention will become more apparent from the following detailed description when taken in conjunction with the accompanying drawings.

DETAILED DESCRIPTION OF THE PREFERRED EMBODIMENT

[Terminal Product Usable Time Management System]

First Embodiment

Figure 1:
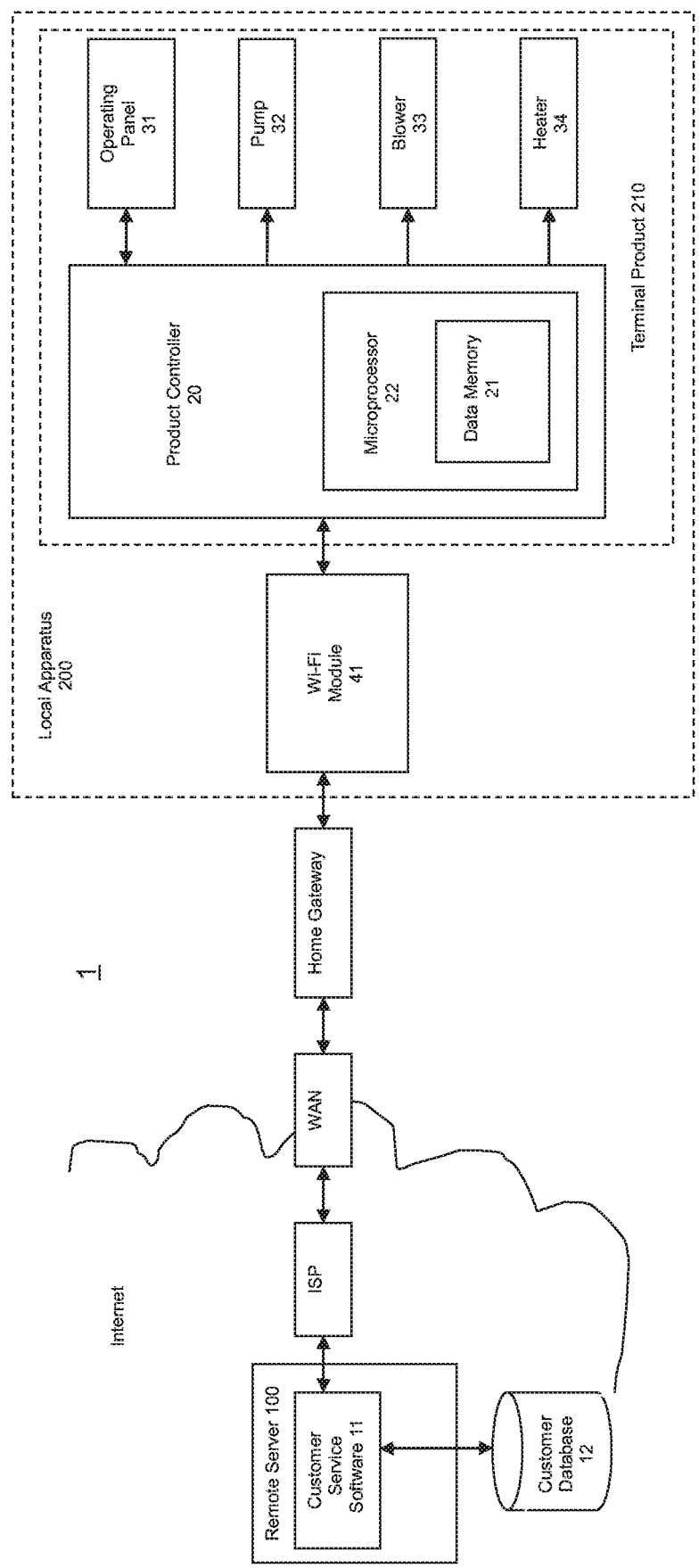
FIG. 1 is a block diagram of the terminal product usable time management system according to the first embodiment of the present invention.

FIG. 1 is a block diagram of the terminal product usable time management system 1 according to the first embodiment of the present invention.

The terminal product usable time management system 1 includes a remote server 100 and a local apparatus 200.

The remote server 100 includes a customer service software 11 and a customer database 12. In some cases, the customer service software 11 and the customer database 12 may frequently interact, and thus inseparable, and thus may be integrated with each other, according to any reasonable computer programming application.

The customer service software 11 of the remote server 100 may generate, encrypt, and send a new expiry date to the local apparatus 200, or it may resend the expiry date to repair (restore) an inaccessible usable time, or send the new expiry date for a renewal contract. In order to resend the expiry date for repair (restoration), the customer service software 11 of the remote server 100 may decrease the usable time synchronously but independently of the local apparatus 200.

The customer database 12 of the remote server 100 may store a purchase date, the usable time and/or an update date of the terminal product 210.

The local apparatus 200 includes a data memory 21, a microprocessor 22, a product controller 20, and a wireless networking device 41.

The data memory 21 stores an identifier and an encrypted usable time of the terminal product 210. The data memory 21 may be a flash memory or a non-volatile memory to prevent data loss due to an interruption of power supply.

The microprocessor 22 is used to send a start notification of a usable time management process. (It is to be understood that the usable time management process may be executed by the product controller 20 or the Wi-Fi module 41, according to different embodiments.) The usable time management process includes the following steps:

(a) Reading the encrypted usable time stored in the data memory 21;

(b) Decrypting the encrypted usable time;

(c) Decreasing the usable time per time unit;

(d) Encrypting the decreased usable time;

(e) Storing the encrypted and decreased usable time into the data memory 21; and (f) Instructing the product controller 20 to disable some or all functions of the terminal product 210, if the usable time is inaccessible or decreased to zero. (In other cases, the product controller 20 may directly compare today's date with the expiry date to determine the expiration of the local apparatus 200, and in these cases, it may read, decrypt, compare with, encrypt and store the expiry date instead of the usable time, and instruct the product controller 20 according to the expiry date instead of the usable time.)

The product controller 20 is used to control at least one product load, such as a pump 32, a blower 33, and/or a heater 34. The product controller 20 and the product load(s) are parts of the terminal product 210. The terminal product 210 may be a SPA bathtub, a SPA pool, a swimming pool, or an aquatic application, but it is not limited thereto.

The wireless networking device 41 is used to communicate with the remote server 100, in order to receive the new expiry date to update the usable time. The wireless networking device 41 may be a Wi-Fi module, a 3G module or any wireless networking module. For simplicity, the Wi-Fi module is shown representative of the wireless networking device 41 in the following description. In case of the Wi-Fi module 41, the communication between the remote server 100 and the local apparatus 200 is established on the internet connection via a home gateway, a wide area network (WAN), and/or an internet service provider (ISP). However, the home gateway, the WAN, and/or the ISP are not essential elements of the terminal product usable time management system 1 according to the present invention.

Here, the local apparatus 200 (the product controller 20 or the Wi-Fi module 41) is further configured to decrease the usable time when the Wi-Fi module 41 is connected or disconnected to an Internet. In other words, internet connection does not affect the counting down of the usable time.

Preferably, the local apparatus 200 (the product controller 20 or the Wi-Fi module 41) may be configured to notify a user to request the new expiry date to update the usable time, if the usable time is inaccessible, or already or almost decreased to zero.

Preferably, the local apparatus 200 (the product controller 20 or the Wi-Fi module 41) may be configured to connect to the internet to download the new expiry date from the remote server 100, if the usable time is inaccessible, or already or almost decreased to zero.

It is appreciated that, a main program including the usable time management process may be executed by the product controller 20 or the Wi-Fi module 41, according to different embodiments of the present invention. The main program will be discussed later.

Here in the first embodiment, the data memory 21 is integrated into the microprocessor 22, and the microprocessor 22 is integrated into the product controller 20. It is the microprocessor 22 of the product controller 20 that used to execute the main program with the data memory 21.

Second Embodiment

Figure 2:
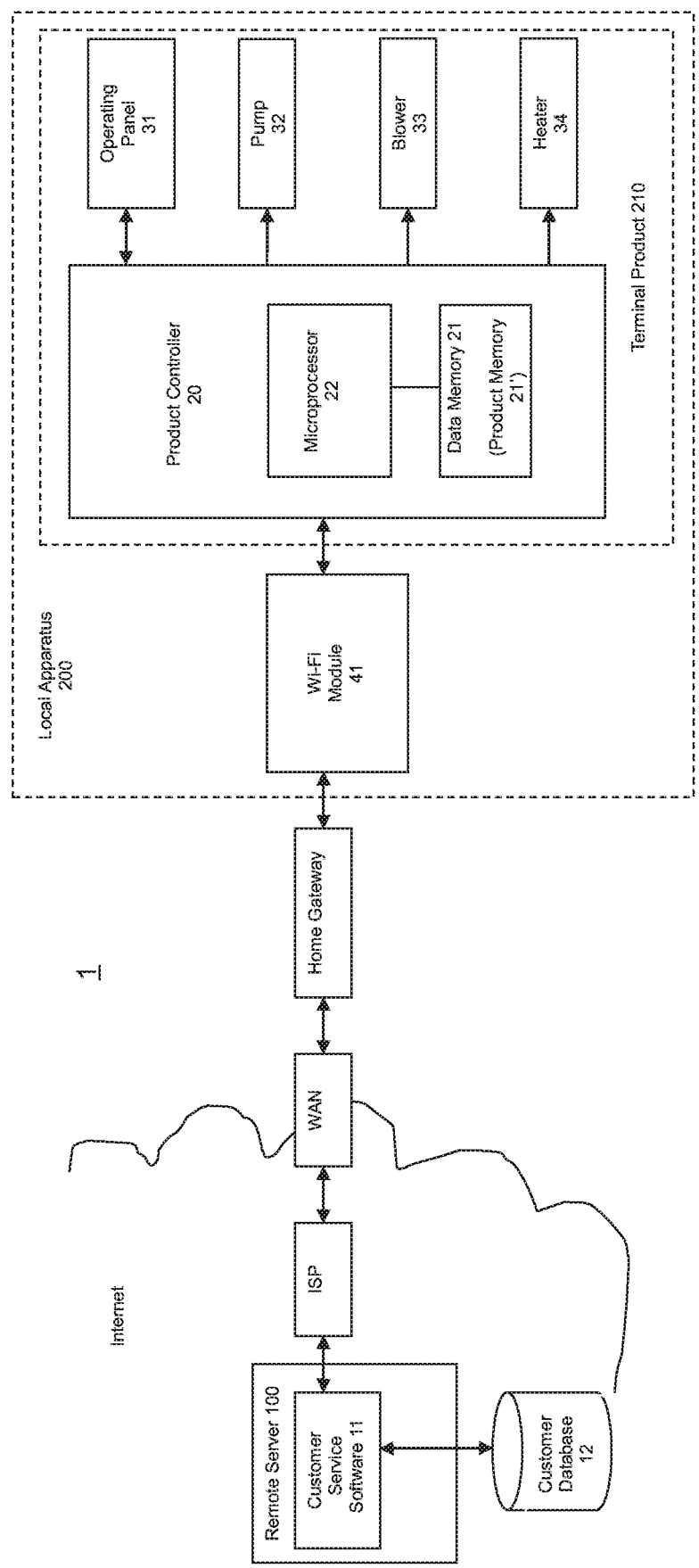
FIG. 2 is a block diagram of the terminal product usable time management system according to the second embodiment of the present invention.

FIG. 2 is a block diagram of the terminal product usable time management system 1 according to the second embodiment of the present invention.

The basic system structure of the second embodiment is similar to that of the first embodiment. However, in the second embodiment, the data memory 21 is out of the microprocessor 22 in the product controller 20. It is the microprocessor 22 that used to execute a main program with the data memory 21.

It is appreciated that, in the first and second embodiments, the Wi-Fi module 41 is only used to provide a communication function rather than a calculation of the usable time.

Moreover, the terminal product 210 may work without the Wi-Fi module 41, because the usable time is stored in the product controller 20 of the terminal product 210. In these cases, the terminal product 210 can work even when there is no internet, or when the internet is unstable, if there is remaining usable time.

Third Embodiment

Figure 3:
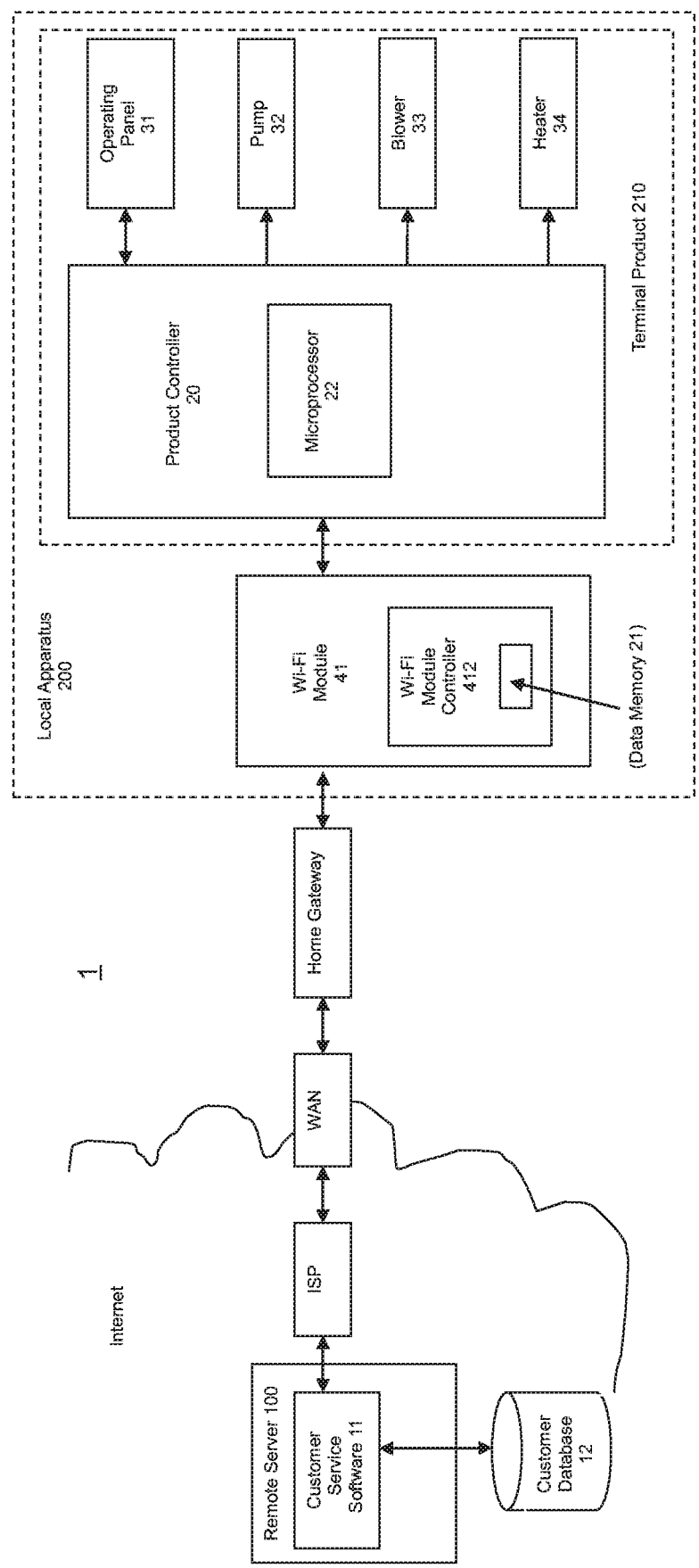
FIG. 3 is a block diagram of the terminal product usable time management system according to the third embodiment of the present invention.

FIG. 3 is a block diagram of the terminal product usable time management system 1 according to the third embodiment of the present invention.

The basic system structure of the third embodiment is similar to that of the first embodiment. However, in the third embodiment, the data memory 21 is integrated into a Wi-Fi module controller 412 of the Wi-Fi module 41. It is the Wi-Fi module controller 412 that used to execute the main program with the data memory 21.

Fourth Embodiment

Figure 4:
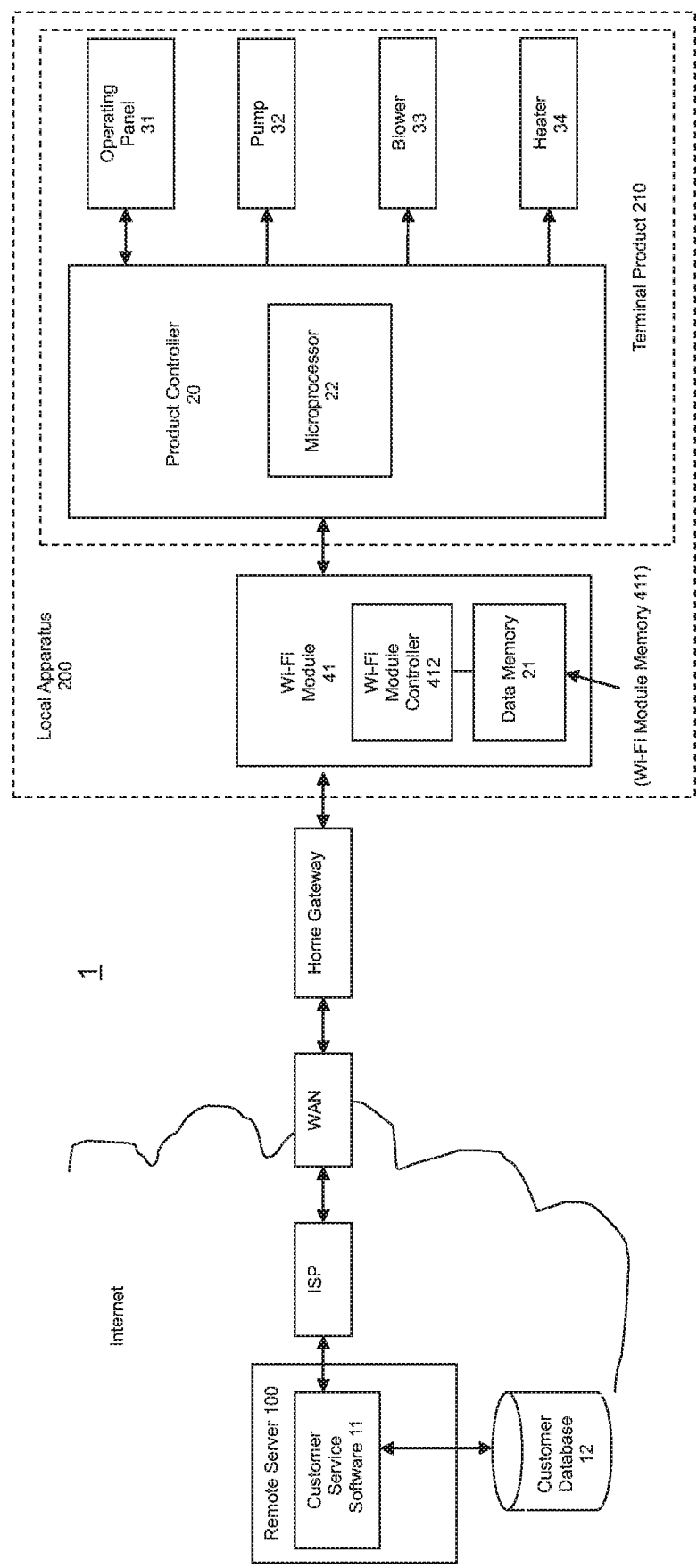
FIG. 4 is a block diagram of the terminal product usable time management system according to the fourth embodiment of the present invention.

FIG. 4 is a block diagram of the terminal product usable time management system 1 according to the fourth embodiment of the present invention.

The basic system structure of the fourth embodiment is similar to that of the third embodiment. However, in the fourth embodiment, the data memory 21 is out of the Wi-Fi module controller 412 in the Wi-Fi module 41. It is the Wi-Fi module controller 412 of the Wi-Fi module 41 that used to execute the main program with the data memory 21.

It is appreciated that, in the third and fourth embodiments, the Wi-Fi module 41 is used to provide a calculation of the usable time in addition to a communicate function.

Moreover, the terminal product 210 must work with the Wi-Fi module 41, because the usable time is stored in the Wi-Fi module 41. Therefore, the microprocessor 22 may be configured to disable some or all functions of the terminal product 210, if the Wi-Fi module 41 is detached from the terminal product 210. However, the Wi-Fi module 41 is not necessary to connected to the internet, if there is remaining usable time.

For simplicity, the following description may only discuss the system, device or method based on the second embodiment. However, the discussed system, device or method is also applicable to other embodiments according to the present invention with appropriate modification.

In the first to fourth embodiments, the terminal product 210 (for example, a SPA bathtub) is equipped with the Wi-Fi module 41 for internet connection. In a general case, when the terminal product 210 is launched for the first time, the terminal product 210 or the Wi-Fi module 41 will automatically connect to the remote server 100 (for example, the website of the seller) to receive an expiry date. With the expiry date, a usable time may be calculated, and then be stored into the memory of the terminal product 210 or the Wi-Fi module 41, and the user can start to use the whole functions of the terminal product 210.

Once the usable time becomes inaccessible (missed or damaged), the terminal product 210 or the Wi-Fi module 41 will automatically connect to the remote server 100 again to receive the expiry date to find the remaining usable time. The remaining usable time allows the user to use the whole functions of the terminal product 210 for the remaining days. In other words, the remaining usable time is used to repair (restore) the inaccessible usable time in the memory.

After the expiry date is downloaded, the usable time will continue being decreased by the microprocessor 22 of the product controller 20, even when the user does not use the terminal product 210, or even without the internet.

When the usable time is already or almost decreased to zero, the terminal product 210 or the Wi-Fi module 41 will automatically connect to the remote server 100 to check whether the customer database 12 has updated customer data or a new expiry date. The usable time will be updated (for example, extended) if there is updated customer data or a new expiry date. Otherwise, the terminal product 210 may notify the user to update the usable time in time by, for example, displaying the notification on the operating panel 31.

Some or all functions of the terminal product 210 may be limited if the usable time expires, i.e. decreased to zero.

In some cases, the terminal product 210 may be bounded with the Wi-Fi module 41, because the usable time is stored in the Wi-Fi module 41. In these cases, if the Wi-Fi module 41 is detached from the terminal product 210, the product controller 20 (in particular, the microprocessor 22) will be unable to read the usable time stored in the Wi-Fi module 41, and thus it will limit some or all functions of the terminal product 210.

The remote server 100 (for example, the website of the seller) has the customer service software 11 and the customer database 12 storing the purchase date, the usable time and/or the update date of the terminal product 210. The customer service software 11 updates the usable time after the user (or the customer) renews his data for extension of use authorization of the terminal product 210.

After updating the usable time, the user can continue using the whole functions of the terminal product 210. In some cases, the terminal product 210 may receive the updated expiry date after rebooting.

The memory used to store the usable time is designed to have a protective mechanism, for example, data encryption, so that the user cannot modify the usable time in the memory. In this way, the usable time stored in the memory remains valid and secure.

Fifth Embodiment: Updating Usable Time Via APP

Figure 14:
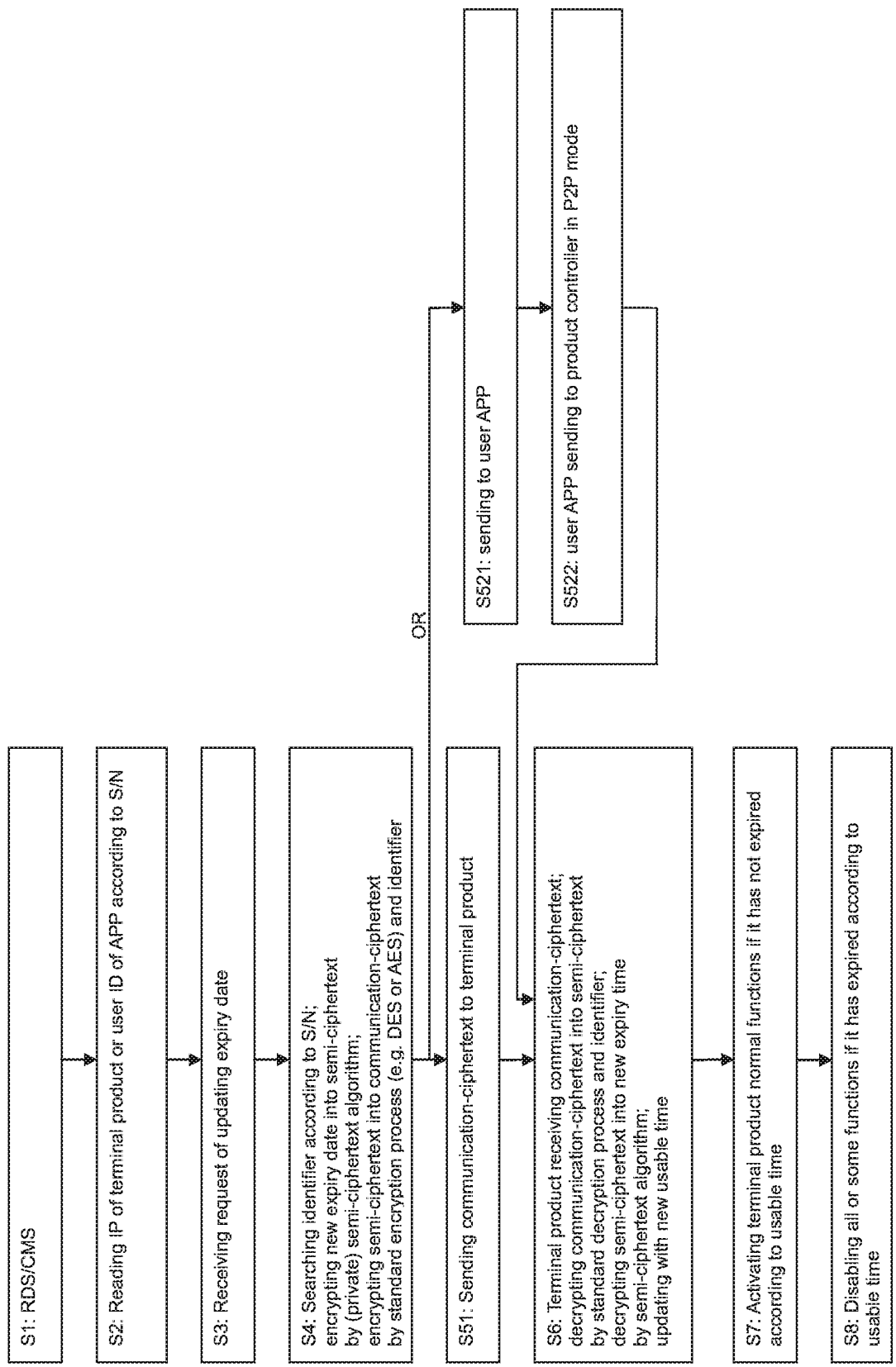
FIG. 14 is a flowchart of the terminal product usable time management method with internet according to one embodiment of the present invention.

FIG. 14 illustratively shows the way of updating the usable time via a mobile application (APP), for example, at steps S521 and S522.

After the user purchases the terminal product 210, the user has to download a (dedicated) APP into his smart phone to interact with the remote server 100, and the user can receive an initial expiry date from the remote server 100 through the APP.

In this case, the user can use the APP of his smart phone to communicate with the product controller 20 through the Wi-Fi module 41, in order to transfer the initial expiry date to the product controller 20 to obtain the initial usable time for storing into the data memory 21 of the product controller to launch the terminal product 210.

When the usable time is about to expire, that is, almost decreased to zero, for example, remaining less than seven days, the user may extend the original contract or reach a new contract with the seller. The seller will renew the customer database 12 of the remote server 100, and the customer service software 11 will generate a new expiry date accordingly.

In a way similar to the case of first purchase, the user can use the APP of his smart phone to download the new expiry date from the remote server 100, and then communicate with the product controller 20 through the Wi-Fi module 41, in order to transfer the new expiry date to the product controller 20 to obtain the new usable time for storing into the data memory 21 of the product controller to update (or extend) the usable time.

The aforementioned situation is only for illustrative purpose, and the present invention is not limited thereto.

Sixth Embodiment: Updating Usable Time Via USB Flash Drive

Figure 13:
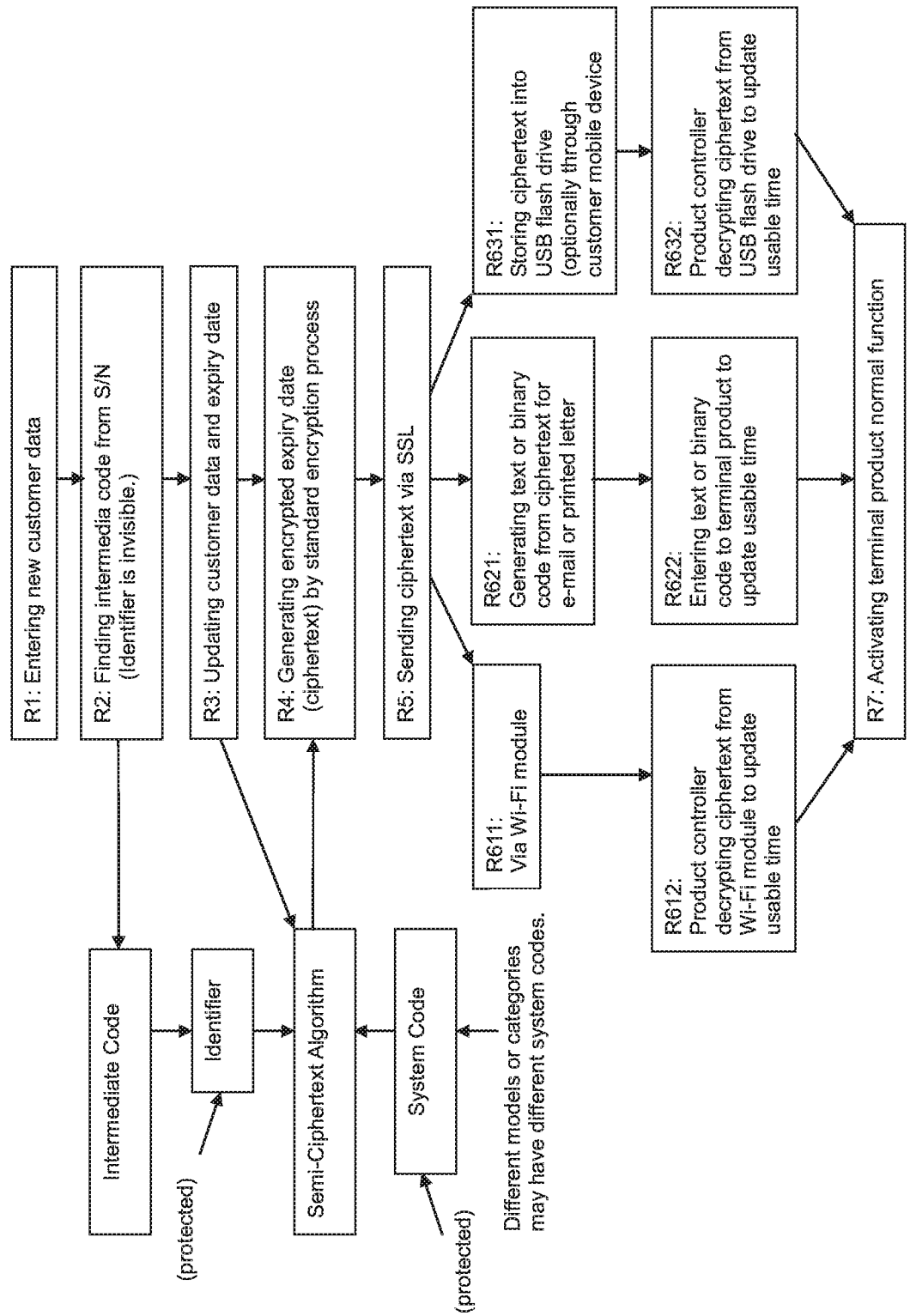
FIG. 13 is an overview flowchart of the usable time management method according to one embodiment of the present invention.
Figure 15:
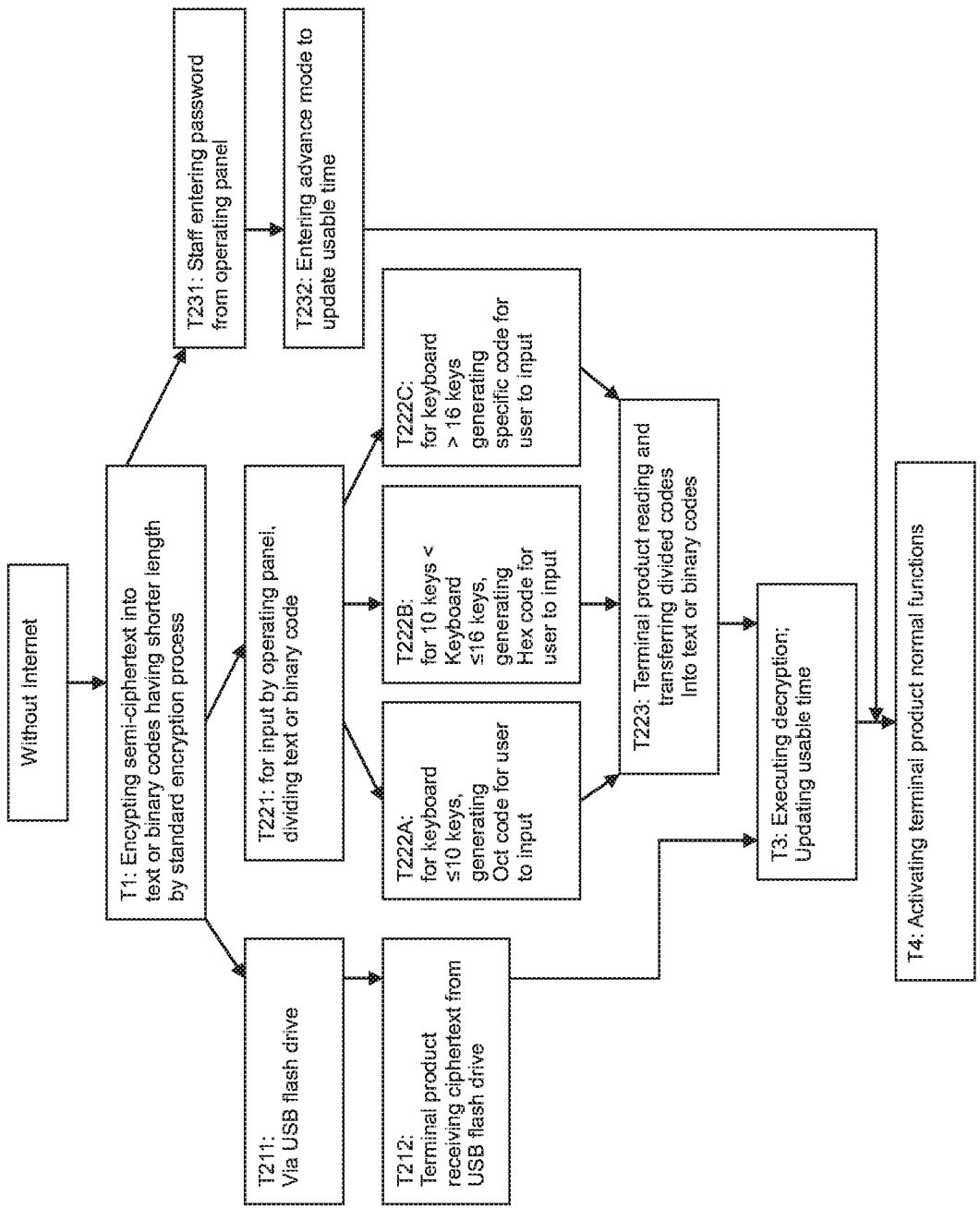
FIG. 15 is a flowchart of the terminal product usable time management method without internet according to one embodiment of the present invention.

FIGS. 13 and 15 illustratively show the way of updating the usable time via a universal serial bus (USB) drive flash, for example, at steps R631 and R632 in FIG. 13, and steps T211 and T212 in FIG. 15.

After the user purchases the terminal product 210 (for example, the SPA bathtub), the seller will give a USB flash drive 42 storing an encrypted initial expiry date to the user. The user has to connect the USB flash drive 42 to the communication port 40 of the product controller 20. The user can start to use the terminal product 210 after the product controller 20 reads out the encrypted initial expiry date from the USB flash drive 42 and then obtains the initial usable time to store into the data memory 21.

When the usable time is about to expire, that is, almost decreased to zero, for example, remaining less than seven days, the user may extend the original contract or reach a new contract with the seller. The seller will renew the customer database 12 of the remote server 100, and the customer service software 11 will generate a new expiry date accordingly.

The seller will give the user a new USB flash drive 42 storing the encrypted new expiry date. The user has to connect the new USB flash drive 42 to the communication port 40 of the product controller 20, and the usable time can be updated (or extended) after the product controller 20 reads out the new expiry date from the USB flash drive 42 and updates the new usable time in the data memory 21.

In other cases, the user may download the encrypted new expiry date from the remote server 100 (for example, the website of the seller) through the internet, store the encrypted new expiry date into the USB flash drive 42, let the product controller 20 to read out the encrypted new expiry date from the USB flash drive 42 and updates the new usable time in the data memory 21, and then complete the update.

The remote server 100 may be built with a remote diagnostic system (RDS) or a customer management system (CMS) to provide various services, for example, a downloading service.

The aforementioned situation is only for illustrative purpose, and the present invention is not limited thereto.

Seventh Embodiment: Updating Usable Time by Staff

FIG. 15 illustratively shows the way of updating the usable time by staff, for example, at steps T231 and T232 in FIG. 15.

When the usable time is about to expire, that is, almost decreased to zero, for example, remaining less than seven days, the user may extend the original contract or reach a new contract with the seller. The seller will renew the customer database 12 of the remote server 100, and the customer service software 11 will generate a new expiry date accordingly.

In this case, the seller will assign a (maintenance) staff to the place of the terminal product 210. The staff may use an operating panel 43 connected to the communication port 40 of the product controller 20, enter a password from the operating panel 43 to enter an advance mode of the product controller 20, and then the staff can directly update (for example, modify) the usable time in the advance mode.

With the updated usable time, the user may continue using the terminal product 210. Otherwise, some or all functions of the terminal product 210 will be limited.

The aforementioned situation is only for illustrative purpose, and the present invention is not limited thereto.

Eighth Embodiment: Updating Usable Time by User

FIGS. 13 and 15 illustratively shows the way of updating the usable time by user, for example, at steps R621 to R622 in FIG. 13, and steps T221 to T223 in FIG. 15.

The remote server 100 (for example, the website of the seller) includes a customer service software 11 executing a usable time management process to calculate (in particular, count down) the usable time, and a customer database 12 storing the usable time. The customer service software 11 may also determine whether the usable time expires, or how long the usable time will expire. The customer service software 11 may also notify the user to update the usable time.

When the usable time is about to expire, that is, almost decreased to zero, for example, remaining less than seven days, the user may extend the original contract or reach a new contract with the seller. The seller will renew the customer database 12 of the remote server 100, and the customer service software 11 will generate a new expiry date accordingly.

In some cases, the remote server 100 may send a short message, an e-mail or a printed letter with special text or binary codes transformed (or encoded) from the new expiry date to the user.

The user has to enter the text or binary codes into a keyboard of the operating panel 43 of the terminal product 210. (The operating panel 43 is used to control the general functions of the terminal product 210, and the keyboard may have some number keys or character keys.) The product controller 20 will inversely transform (or decode) the text or binary codes into the new expiry date, and thus update the usable time.

With the updated usable time, the user may continue using the terminal product 210. Otherwise, some or all functions of the terminal product 210 will be limited.

The aforementioned situation is only for illustrative purpose, and the present invention is not limited thereto.

It should be noted that, the encrypted expiry date is unique for every time, every user, and every type of the terminal products.

[Ciphertext Length]

Since the USB flash drive and the Wi-Fi module 41 provides relatively high transmission speed, they can be used to transmit a ciphertext has a length of 512 bits or 256 bits. Such a ciphertext is relatively secure because of its long length.

Therefore, a ciphertext has a length of 512 bits, 256 bits or more bits may be used in the aforementioned first to sixth embodiments, while the aforementioned seventh to eighth embodiments can only support a ciphertext has a shorter length.

[Terminal Product Usable Time Management Device]

Figure 5:
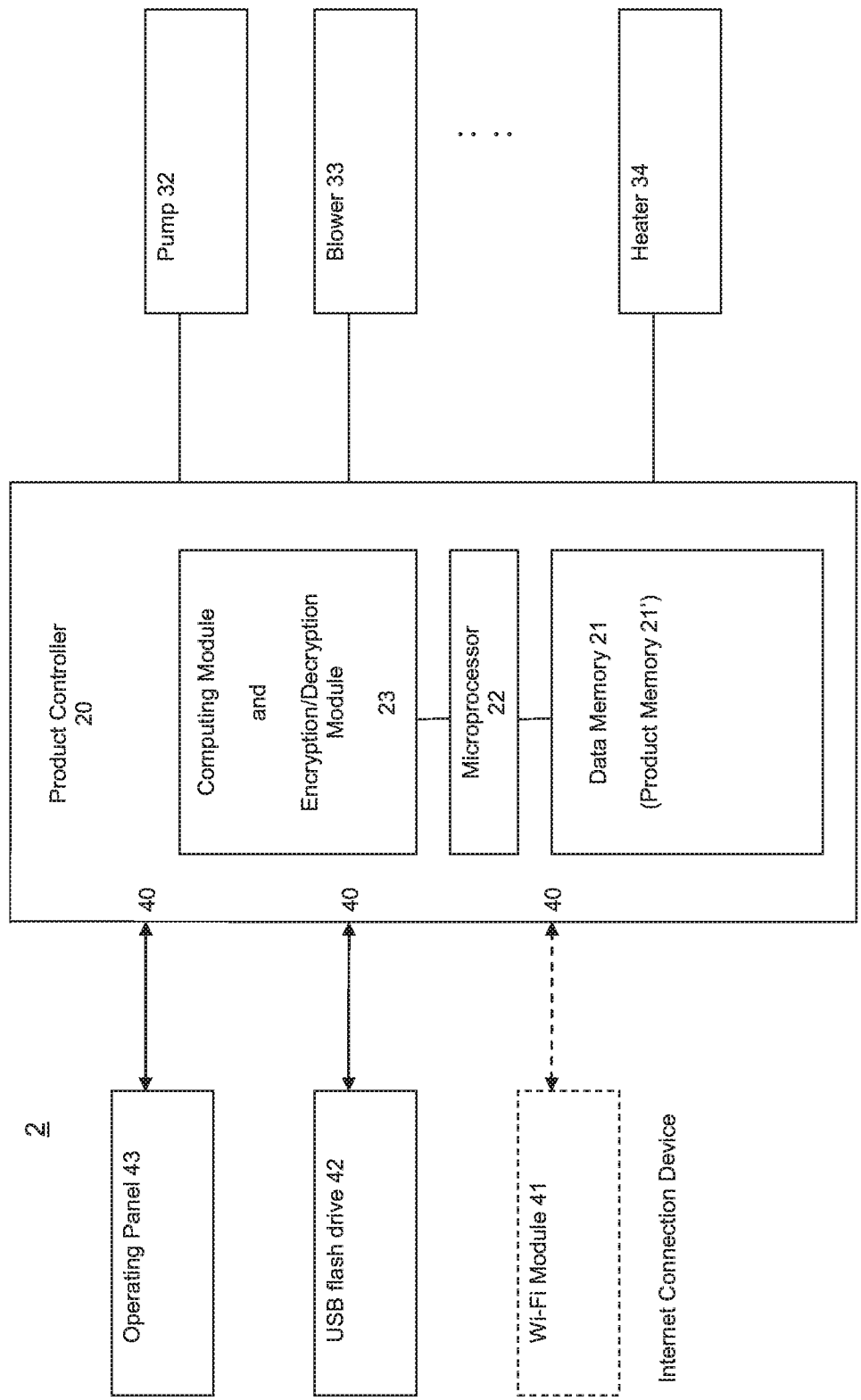
FIG. 5 shows the terminal product usable time management device according to one embodiment of the present invention.

FIG. 5 shows the terminal product usable time management device 2 according to one embodiment of the present invention.

Relevant components not shown in FIG. 5 may be found in FIGS. 1 to 4.

The terminal product usable time management device 2 includes a data memory 21, a microprocessor 22, a product controller 20, and at least one communication port 40.

The data memory 21 stores an identifier and an encrypted usable time of the terminal product 210.

The microprocessor 22 is used to execute a usable time management process. The usable time management process includes the following steps:

(a) Reading the encrypted usable time stored in the data memory 21;

(b) Decrypting the encrypted usable time;

(c) Decreasing the usable time per time unit;

(d) Encrypting the decreased usable time;

(e) Storing the encrypted and decreased usable time into the data memory 21; and (f) Instructing the product controller 20 to disable some or all functions of the terminal product 210, if the usable time is inaccessible or decreased to zero.

The product controller 20 used to control at least one product load, such as a pump 32, a blower 33, and/or a heater 34. The product controller 20 and the product load(s) are parts of the terminal product 210. The terminal product 210 may be a SPA bathtub, a SPA pool, a swimming pool, or an aquatic application, but it is not limited thereto.

The at least one communication port 40 is used to connected to at least one external device, such as an Wi-Fi module 41 (serving as an internet connection device), a USB flash drive 42 and/or an operating panel 43, in order to receive a new expiry date for the microprocessor 22 to update the usable time. In this case, there are three communication ports 40. Preferably, the new expiry date received from the external device is encrypted, so that the user cannot read the expiry date from the external device.

In this case, the data memory 21 and the microprocessor 22 are integrated into the product controller 20. As previously discussed, in other embodiments, the data memory 21 may be integrated into the Wi-Fi module 41. In addition to the data memory 21 and the microprocessor 22, the product controller 20 may further include a unit including a computing module and an encryption/decryption module. In other cases, the unit 23 including a computing module and an encryption/decryption module may be integrated into the microprocessor 22.

The product controller 20 may be implemented in various ways. It may include the following elements:

(a) A communication mechanism used to communicate with a remote server 100 through the Wi-Fi module 41, wherein the communication may be established on the currently existing network, and encrypted based on an open encryption standard to ensure transmission in security;

(b) The usable time and the identifier, both encrypted by a special algorithm, including the semi-ciphertext algorithm according to the present invention; and (c) The usable time management process according to the present invention used to calculate the usable time.

In case that the external device is the Wi-Fi module 41, it communicates with a remote server 100, in order to receive a new expiry date for the microprocessor 22 to update the usable time or the expiry date.

In case that the external device is a universal serial bus (USB) flash drive 42, it stores an encrypted new expiry date for the microprocessor 22 to update the usable time or the expiry date.

In case that the external device is an operating panel 43, the staff may use it to enter an advance mode of the product controller 20 and then update the usable time or the expiry date in the advance mode, or the user may use it to key-in an encrypted new expiry date for the microprocessor 22 to update the usable time or the expiry date.

The aforementioned product controller 20 is an illustrative example suitable to the aforementioned second embodiment shown in FIG. 2.

[Product Controller Computing Units]

Figure 6:
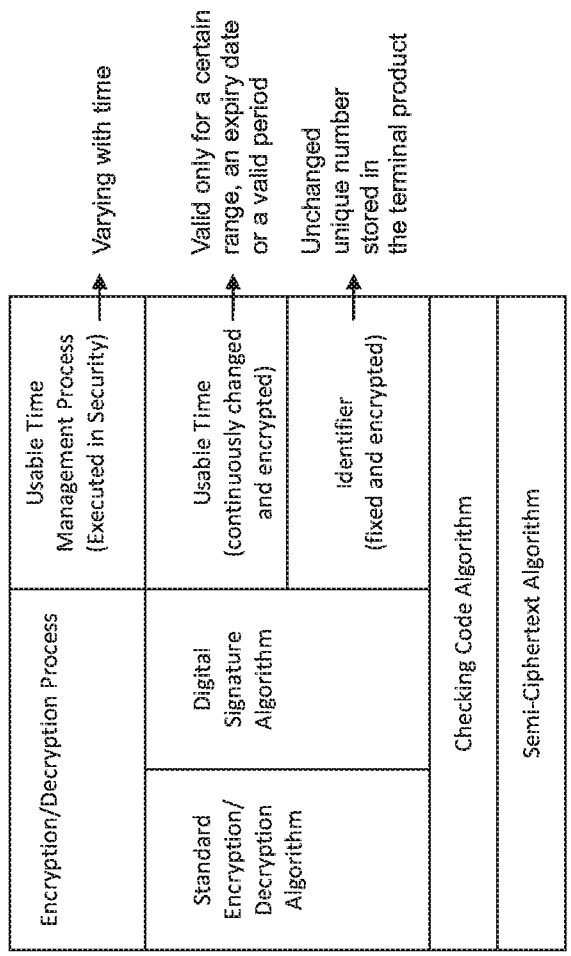
FIG. 6 is a software stack of the computing units in the product controller according to one embodiment of the present invention.

FIG. 6 is a software stack of computing units in the product controller 20 according to one embodiment of the present invention. The blocks shown in FIG. 6 only represent the interaction among the computing units, but do not represent physical locations or structures of the computing units.

Relevant components not shown in FIG. 6 may be found in FIGS. 1 to 5.

The encryption/decryption process is used to encrypt or decrypt data by the open standard encryption/decryption algorithm, which may be further cooperated with the digital signature algorithm.

The checking code is used to confirm the correctness of the data.

The semi-ciphertext algorithm is a private algorithm provided by the present invention. The semi-ciphertext algorithm is the key point in the present invention, and will be discussed in detailed later. It is to be understood that, the term "private" in the present description means that it is not an open standard (i.e. non-open standard).

The usable time management process is used to manage the usable time which varies with time.

The usable time refers to a certain range, an expiry date or a valid period for the user to use the whole functions of the terminal product 210.

The identifier is an unchanged unique number stored in the terminal product 210. Preferably, the identifier may be encrypted by the private semi-ciphertext algorithm according to the present invention.

[Main Program]

Figure 7:
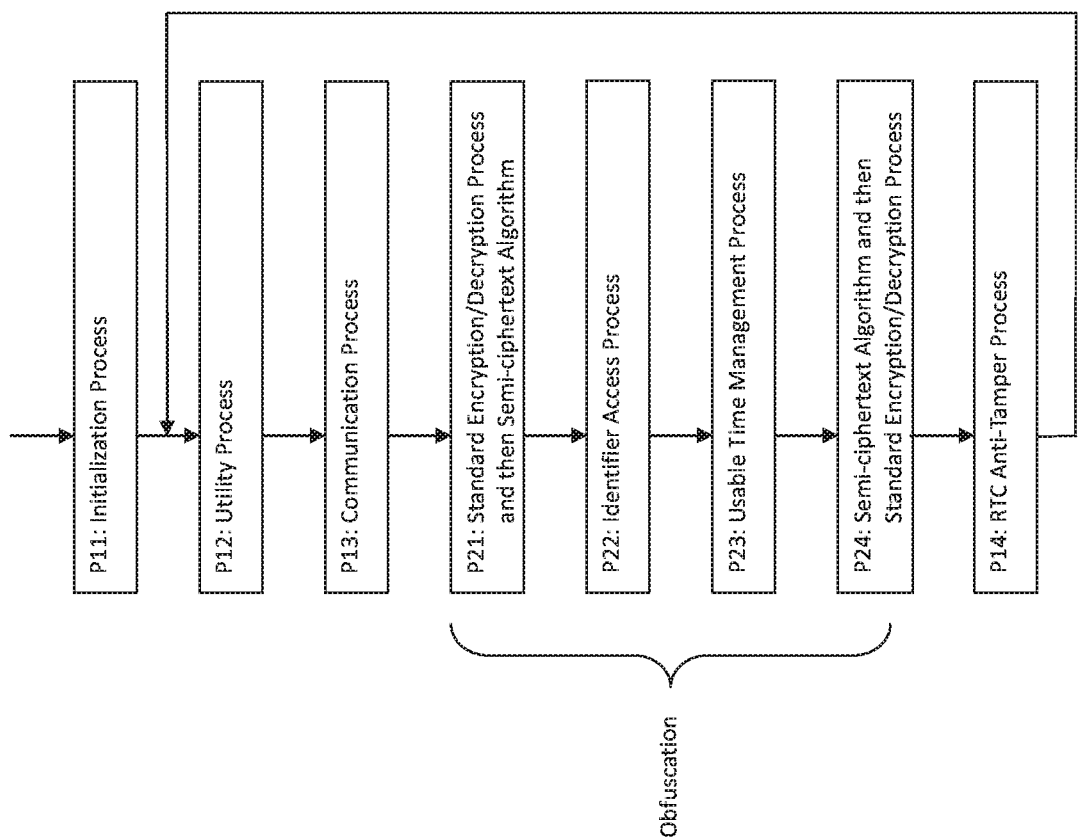
FIG. 7 is a flowchart of the main program in the product controller according to one embodiment of the present invention.

FIG. 7 is a flowchart of the main program in the product controller 20 according to one embodiment of the present invention.

Relevant components not shown in FIG. 7 may be found in FIGS. 1 to 5.

It is to be understood that the terms "program", "process" or "algorithm" in the present description may refer to a single step or plural steps based on various definitions, and there is no essential subordination among them, except the subordination is specified.

In this case, the main program is executed by the microprocessor 21 of the product controller 20. However, in other embodiment, the main program may be executed by the Wi-Fi module controller 412 of the Wi-Fi module 41, as previously discussed.

Generally, the main program of the product controller 20 includes an initialization process P11, a utility process P12, a communication process P13, a standard encryption/decryption process P21, an identifier access process 22, a usable time management process P23, a semi-ciphertext algorithm P24, and an RTC anti-tamper process P14. The end of the RTC anti-tamper process P14 may be followed by the beginning of the utility process P12, and accordingly forming a circulation.

According to the present invention, some obfuscation may be applied to the standard encryption/decryption process, the identifier access process, the usable time management process, and/or the semi-ciphertext algorithm, so that the main program cannot be traced and cracked.

The obfuscation provides more protection for encryption and decryption. A person has to spend more time and effort to crack an obfuscated program.

A ciphertext may be formed by a set of various encryption processes. According to the present invention, in addition to the standard encryption processes, the semi-ciphertext algorithm is provided to enhance the encryption security. It is appreciated that the semi-ciphertext algorithm is also applicable to many fields.

[Usable Time Management and Protection]

In order to prevent the user from illegally modifying the real time clock (RTC) to deceive the terminal product 210, or reusing the original expire date, it is important to introduce a protective usable time management process.

The usable time is calculated based on the coordinated universal time (UTC). The usable time is obtained from the expiry date which is downloaded to the local apparatus 200. The usable time is encrypted and stored in a specific location in a data memory 21. The data memory 21 is designed to prevent data loss due to an interruption of power supply.

Normally, the RTC runs forward to the future. It forbids running the RTC backward to the past. The user can only adjust the RTC within a specific range, for example, one to two days. However, such an adjustment is further limited by the expiry date. Therefore, the user cannot modify the RTC to extend the original usable time.

The usable time refers to remaining days for the user to use the whole functions of the terminal product 210, so it is a variant datum, which elapses and decreases with time. In particular, the usable time is decreased per time unit by the usable time management process. The time unit may be a day, an hour, a minute, or a second, and used to count the use time of the terminal product 210. A use time means that how long the terminal product has been used. It is important to ensure the decreasing operation.

The user cannot extend the usable time by tampering with real time clock (RTC), because the usable time management process compares the usable time, the use time, the expiry date, and/or today (the newest expiry date) stored in the data memory 21.

If the user modifies the system clock (RTC) of the terminal product 210, modifying it back to the past, far away from the expected expiry date, the duration between the expected expiry date and today will be longer than the usable time (the expected expiry date−today>the usable time), and thus the modification will not be accepted by the product controller 20 of the terminal product 210. However, if the duration between the expected expiry date and today is shorter than or equal to the usable time (the expected expiry date−today≤the usable time), the modification will be accepted by the product controller 20 of the terminal product 210.

For the aforementioned mechanism, the usable time, the use time, the expiry date and/or today (the newest expiry date) may be stored in the data memory 21 of the product controller 20 of the terminal product 20, in order to perform calculations, operations or comparisons to determine the reasonableness of the modification of the RTC.

Of course, the user cannot tamper with the usable time or the expiry date directly, because the usable time or the expiry date is encrypted.

The expiry date is (or generally, includes) a datum of a date, by which the usable time can be calculated. (Indeed, there may be mathematical interrelation between the he expiry date and the usable time.) Suppose that today (for example, Jan. 1, 2018), a user receives an expiry date for one-year usable time. Then, the usable time will be decreased to zero after one year (for example, Jan. 1, 2019). If the usable time stored in the local apparatus 200 (in the data memory 21) is missed or damaged, the user may request the remote server 100 to resend the expiry date to the local apparatus 200. However, if the user requests the expiry date after the last day of the one year (for example, Jan. 1, 2019), the user will receive an expiry date and its usable time is already decreased to zero.

Suppose that the usable time will expire in one month (for example, Dec. 1, 2018). If the user requests the remote server 100 to resend the expiry date to the local apparatus 200, the user will receive the expiry date which remains only one month. The remote server 100 will not send a brand new expiry date or a reset usable time to the local apparatus 200, because the remote server 100 also executes a usable time management process to decrease the usable time synchronously but independently of the local apparatus 200. The usable time will continue being decreased by the remote server 100, even when the user does not use the terminal product 210. Therefore, the remote server 100 will send the expiry date for offering the remaining usable time instead of a brand new expiry date or a reset usable time to the local apparatus 200 in this case.

In the aforementioned system, the remote server 100 and the local apparatus 200 both execute their respective usable time management processes to decrease the usable time synchronously but independently. The usable time management process executed by the remote server 100 is useful to resend the expiry date, and the usable time management process executed by the local apparatus 200 is useful to determine the functions of the terminal product 210.

In some cases, the terminal product 210 may be turned off unexpectedly/manually or suffer a control system crash, and the usable time stored therein becomes inaccessible (missed or damaged), but has not expired (for example, remaining one month). The user may request the seller to resend the expiry date to the user.

There are several ways for the user to repair (restore) the inaccessible usable time. For example, the user may use a Wi-Fi module 41 as previously discussed, or a USB flash drive 42, or an operating panel 43 of the terminal product 210.

In case of using a USB flash drive, the user may connect the internet, and then enter the serial number of the terminal product 210 from the webpage, and send it to the remote server 100, and the remote server 100 will send the encrypted expiry date via the webpage to the user. The user may save the encrypted expiry date into the USB flash drive 42, connecting the USB flash drive 42 to the terminal product 210 (in particular, the product controller 20), thereby activating the whole functions of the terminal product 210.

In case of using an operating panel 43 of the terminal product 210, the user may connect the internet, and then enter the serial number of the terminal product 210 from the webpage, and send it to the remote server 100, and the remote server 100 will send a text or binary codes transformed (or encoded) from the expiry date via the webpage to the user. The user may enter the text or binary codes from the operating panel 43 into the product controller 20, thereby activating the whole functions of the terminal product 210.

However, the resent expiry date only offers a one-month usable time.

According to the present invention, the usable time management process forbids the user to reuse the encrypted expiry date stored in the USB flash drive 42. If the user has used the encrypted expiry date stored in the USB flash drive 42 yesterday, and he tries to reuse the encrypted expiry date by reconnecting the same USB flash drive 42 to the product controller 20 of the terminal product 210 today, since one day has elapsed from yesterday to today, the user will obtain a usable time still decreased by one day.

Moreover, after the terminal product 210 has read out the encrypted expiry date stored in the USB flash drive 42, and 23 hours has elapsed, the elapsed 23 hours will be recorded in the terminal product 210 (for example, the data memory 21 of the product controller 20). With the elapsed time recorded, the usable time management process also forbids the user to extend the usable time by rebooting the terminal product 210 and modifying the system clock (RTC) of the terminal product 210 back to the past. That is to say, the usable time management process is designed to record the elapsed time after the terminal product 210 has read out the encrypted expiry date stored in the USB flash drive 42, and subtract the elapsed time from the usable time which is obtained from the encrypted expiry date reread from the same USB flash drive 42.

After being decreased, the usable time is encrypted and stored in a flash memory or a non-volatile memory, so that the usable time can remain secure when an interruption of power supply happens. The encryption includes the private semi-ciphertext algorithm according to the present invention.

In order to prevent the user from interfering the time setting of the terminal product 210 by turning off or crashing the system of the terminal product 210, the terminal product 210 has to repair (restore) the usable time (for example, by resending the encrypted expiry date from the remote server 100) after the terminal product 210 is rebooted. With the usable time missed or damaged, some or all functions of the terminal product 210 will be limited.

It should be noted that, the usable time is preferably stored in a flash memory or a non-volatile memory to prevent data loss due to an interruption of power supply, so that the calculation of the usable time may not be interfered simply by turning off or crashing the system of the terminal product 210.

[Semi-Ciphertext Algorithm]

Figure 8:
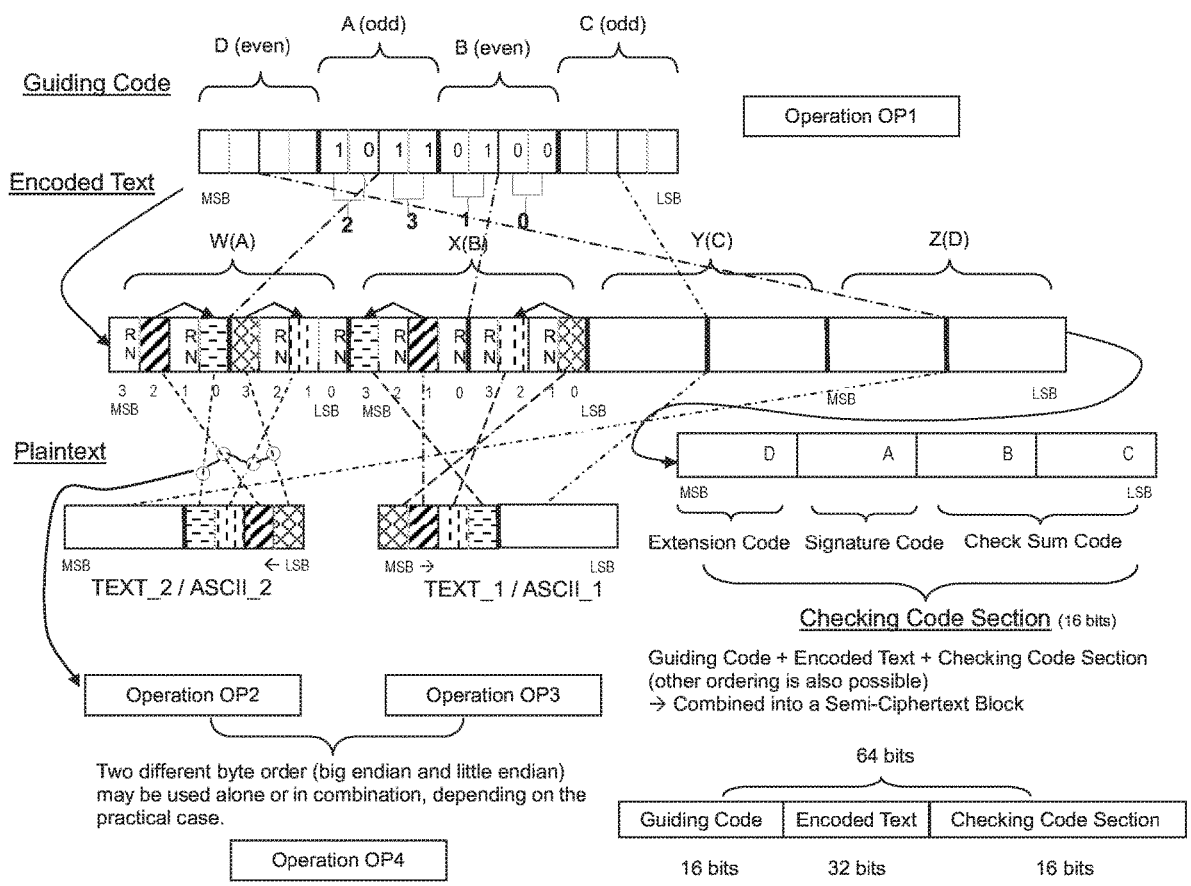
FIG. 8 is an architecture diagram of the semi-ciphertext algorithm according to one embodiment of the present invention, which illustrates the encryption process and method for a semi-ciphertext block.

FIG. 8 is an architecture diagram of the semi-ciphertext algorithm according to one embodiment of the present invention, which illustrates the encryption process and method for a semi-ciphertext block.

Relevant components not shown in FIG. 8 may be found in FIGS. 1 to 5.

In the usable time management system 1 according to the present invention, the user may use the whole functions of the terminal product 210 only with a usable time. The usable time and other essential plaintext data are hidden in a special ciphertext generated by the semi-ciphertext algorithm according to the present invention. Such a special ciphertext provides a secure mechanism which prevents the user from using the terminal product 210 with an unusable time. With the special ciphertext, the management and the update of the usable time may be performed in secure ways.

The semi-ciphertext algorithm according to the present invention is used to generate a semi-ciphertext composed of a guiding code, an encoded text and a checking code.

In particular, referring to FIG. 8, the semi-ciphertext algorithm includes the following steps:

The step Q1 is generating a random number by a standard random number generator, dividing the random number into a plurality of groups, each group having a plurality of binary bits, reordering the plurality of groups to form the guiding code according to the plurality of binary bits.

In particular, the step Q1 may perform a reordering operation based on the values of the groups (labeled as "Operation OP1" in FIG. 8).

As shown in FIG. 8, the 16-bit random number is divided into four groups, and each group has four binary bits. Each group corresponds to a value, and the four groups are labeled by A, B, C, D, for the value of group A>the value of group B>the value of group C>the value of group D.

In the exemplary case of FIG. 8, the rule of the reordering operation is to reorder the 16-bit random number to be: D-A-B-a where the value of group A>the value of group B>the value of group C>the value of group D. (If two groups have the same value, there is a further rule defining that the left group is larger than the right group.) The code D-A-B-C is the guiding code according to the present invention. The groups D and B of the guiding code are defined to be even sections and the groups A and C of the guiding code are defined to be odd sections. The aforementioned definition is given according to the relative positions of the groups.

The step Q2 is receiving a plaintext containing at least one datum regarding the usable time or the expiry date, corresponding the plaintext to the guiding code, and dividing the plaintext into odd sections and even sections.

In the exemplary case of FIG. 8, the plaintext may include two plaintext data TEXT_1, TEXT_2 to be encrypted, each of the plaintext data having one byte, that is, 8 bits, so that the plaintext has 16 bits. Similarly, the plaintext is divided into four groups, and each group has four bits. The four groups of the plaintext directly correspond to the four groups of the guiding code, respectively, which means that, the first group (4 bits counted from the right) of the plaintext corresponds to group D of the guiding code, the second group (4 bits) of the plaintext corresponds to group A of the guiding code, the third group (4 bits) of the plaintext corresponds to group B of the guiding code, and the fourth group (4 bits) of the plaintext corresponds to group C of the guiding code. Therefore, the first and third groups of the plaintext belong to even sections, and the second and the fourth groups of the plaintext belong to odd sections.

The step Q3 is defining a buffer of the encoded text, a number of bits of the buffer is more than a number of bits of the plaintext; altering the each bit of the plaintext according to given rules; and storing the each altered bit of the plaintext into specific positions of the buffer according to the given rules.

In the exemplary case of FIG. 8, the buffer has 32 bits, and is divided into four groups W, X, Y, Z, each group having 8 bits. The groups W, X, Y, Z of the buffer correspond to the four groups A, B, C, D, respectively. Further couple with the above correspondence: the plaintext corresponds to the guiding code, the each bit of the plaintext is altered according to the given rules, and stored into the specific positions of the buffer according to the given rules.

In particular, the given rules includes a determination of belonging to the odd section or the even section against the each bit of the plaintext, a value of corresponding bit(s) of the guiding code, a position of the each bit of the plaintext, a value of the each bit of the plaintext, a logical operation, and/or a bit shifting operation.

In the exemplary case of FIG. 8, the given rules are used to instruct the following operations to alter the each bit of the plaintext:

(a) The order of execution for altering the each bit of the plaintext

For the first plaintext data TEXT_1, the left part (the left 4 bits) of TEXT_1 corresponds to the group B of the guiding code, and belongs to the even section, so the alteration begins from the MSB of the left 4 bits of TEXT_1. The bits are altered from the most significant bit (MSB) to the least significant bit (LSB).

For the second plaintext data TEXT_2, the right part (the right 4 bits) of TEXT_2 corresponds to the group A of the guiding code, and belongs to the odd section, so the alteration begins from the LSB of the right 4 bits of TEXT_2. The bits are altered from LSB to MSB.

(b) The alteration patterns of the each bit of the plaintext

For odd sections, the each bit of the plaintext is performed the logical operation XOR (⊕) with the corresponding bit of the guiding code. This is called the forward code alteration. This operation is labeled as "Operation OP2" in FIG. 8.

For even sections, the each bit of the plaintext is performed the logical operation NOT. This is called the backward code inversion. This operation is labeled as "Operation OP3" in FIG. 8.

It is to be understood that, the aforementioned logical operations are exemplary and not meant to limiting. Optionally, an XOR operation, an AND operation, an OR operation, or a NOT operation may be applied in bit alteration. The XOR operation, the AND operation and the OR operation each includes a second operand having the value of the corresponding bit(s) of the guiding code or the value of the bit of the plaintext.

(c) The storage of the each bit of the plaintext (labeled as "Operation OP4" in FIG. 8)

[Rule]

Each bit in the plaintext is altered, and then stored into a specially defined position in the encoded text (buffer) respectively.

The following process uses the plaintext in FIG. 8 as an example (TEXT_2/TEXT_1)

This process applies to each group in the plaintext: left 4 bits of TEXT_2, right 4 bits of TEXT_2, left 4 bits of TEXT_1 and right 4 bits of TEXT_1 (corresponds to Group D, Group A, Group B and Group C of the guiding code respectively).

The processing order is based on the definition of the processing order of described above (a).

In the plaintext: left 4 bits of TEXT_2, right 4 bits of TEXT_2, left 4 bits of TEXT_1 and right 4 bits of TEXT_1 corresponds to Group Z, Group W, Group X and Group Y of the encoded text respectively.

The first bit in the processing order: the value of the right two bits of the corresponding group in the guiding code is the position code in the right 4 bits of the corresponding group in the encoded text (from right to left coded 0, 1, 2 and 3) for storing the altered first bit.

The second bit in the processing order: the value of the left two bits of the corresponding group in the guiding code is the position code in the left 4 bits of the corresponding group in the encoded text (from right to left coded 0, 1, 2 and 3) for storing the altered second bit.

The third bit in the processing order: the second position to the right/left of the position of the altered first bit for storing the altered third bit.

The fourth bit in the processing order: the second position to the right/left of the position of the altered second bit for storing the altered fourth bit.

EXAMPLE

The group B of the guiding code corresponds to the second group of the plaintext (left 4 bits of TEXT_1):

The value of the right 2 bits of the group B of the guiding code is 0, so the left first bit of the left 4 bits of TEXT_1 is performed the logical operation NOT, the result is stored into the position coded "0" in the right 4 bits of the buffer's the group X(B).

The value of the left 2 bits of the group B of the guiding code is 1, so the left second bit of the left 4 bits of TEXT_1 is performed the logical operation NOT, the result is stored into the position coded "1" in the left 4 bits of the buffer's the group X(B).

The left third bit of the left 4 bits of TEXT_1 is performed the logical operation NOT, the result is stored into the position left side second position of the position storing the operation result of the left first bit of the left 4 bits of TEXT_1, limited in the right 4 bits of the buffer's the group X(B).

The left fourth bit of the left part of TEXT_1 is performed the logical operation NOT, the result is stored into the position left side second position of the position storing the operation result of the left second bit of the left 4 bits of TEXT_1, limited in the left 4 bits of the buffer's the group X(B).

The group A of the guiding code corresponds to the third group of the plaintext (the right 4 bits of TEXT_2):

The value of the right 2 bits of the group A of the guiding code is 3, so the right first bit of the right 4 bits of TEXT_2 is performed the logical operation XOR with the corresponding bit of the guiding code, the result is stored into the position coded "3" in the right 4 bits of the buffer's the group W(A).

The value of the left 2 bits of the group A of the guiding code is 2, so the right second bit of the right 4 bits of TEXT_2 is performed the logical operation XOR with the corresponding bit of the guiding code, the result is stored into the position coded "2" in the left 4 bits of the buffer's the group W(A).

The right third bit of the right 4 bits of TEXT_2 is performed the logical operation XOR with the corresponding bit of the guiding code, the result is stored into the position right side second bit of the position storing the operation result of the right first bit of the right 4 bits of TEXT_2, limited in the right 4 bits of the buffer's the group W(A).

The right fourth bit of the right 4 bits of TEXT_2 is performed the logical operation XOR with the corresponding bit of the guiding code, the result is stored into the position right side second bit of the position storing the operation result of the right second bit of the right 4 bits of TEXT_2, limited in the left 4 bits of the buffer's the group W(A).

It is to be understood that, the aforementioned storage operations are exemplary and not meant to limiting. Other storage operations are also possible, with bit positions assigned by considering the values and positions of the guiding code with respect to the positions of the altered bits of the plaintext, as long as there is no confliction between bit position assignments.

The step Q4 is filling up a remaining part of the buffer with enough bits of random numbers. In the exemplary case of FIG. 8, the remaining part of the 32-bit buffer has 16 bits, so the 16 bits has to be filled up with random numbers.

The step Q5 is generating the checking code by a standard checking code method.

In this case, 16-bit plaintext is protected in the 32-bit encoded text defined by the buffer. However, in other embodiment, a plaintext has a length of other than 16 bits may be protected in an encoded text has a length of other than 32 bits, in a similar way as previously discussed.

In the semi-ciphertext algorithm according to the present invention, the nibbles (a nibble refers to a group having 4 bits) of the plaintext are reordered with respect to their relative positions at first. Then, the bits of a nibble of the plaintext go through processes of bit alternation, bit inversion, bit shifting and/or bit filling, and therefore a randomization is realized in a very short process.

In the exemplary case of FIG. 8, the encryption process is designed for a 2-byte plaintext. (2 bytes=8 bits×2=ASCII×2.) Considering an 8-byte plaintext containing a 4-byte identifier and a 4-byte usable time, the encryption process has to be performed 4 times.

Figure 9:
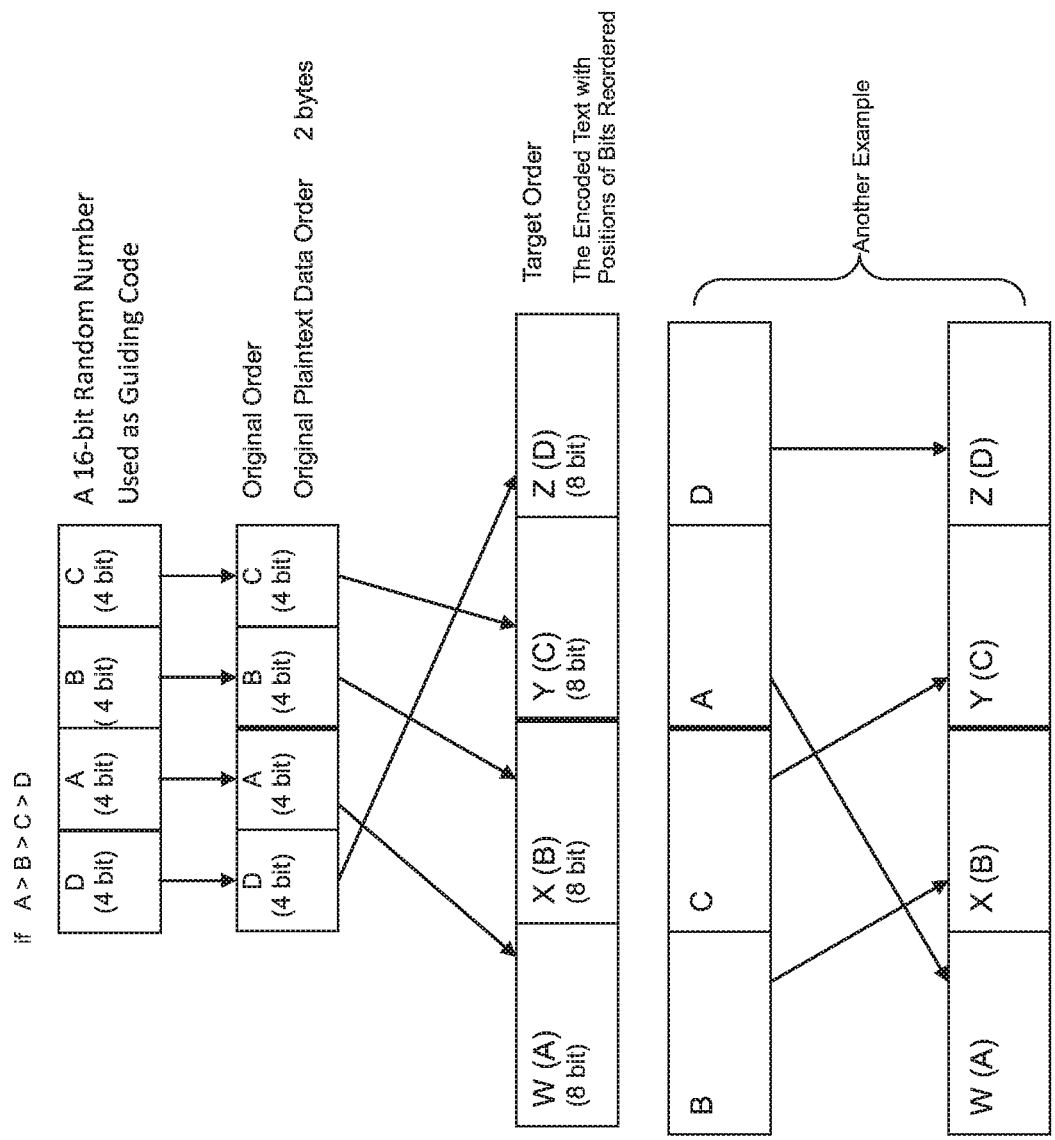
FIG. 9 is a simplified architecture diagram of the bits reordering step for the encoded text according to one embodiment of the present invention.

FIG. 9 is a simplified architecture diagram of the semi-ciphertext algorithm according to one embodiment of the present invention.

Generally speaking, the principle of the semi-ciphertext algorithm is to use an encoding of a former step to guide an encoding of a later step with respect to each bit's value and/or position, wherein the former step refers to the guiding code's reordering, and the later step refers to the encoded text's reordering, as shown in FIG. 9.

Figure 10:
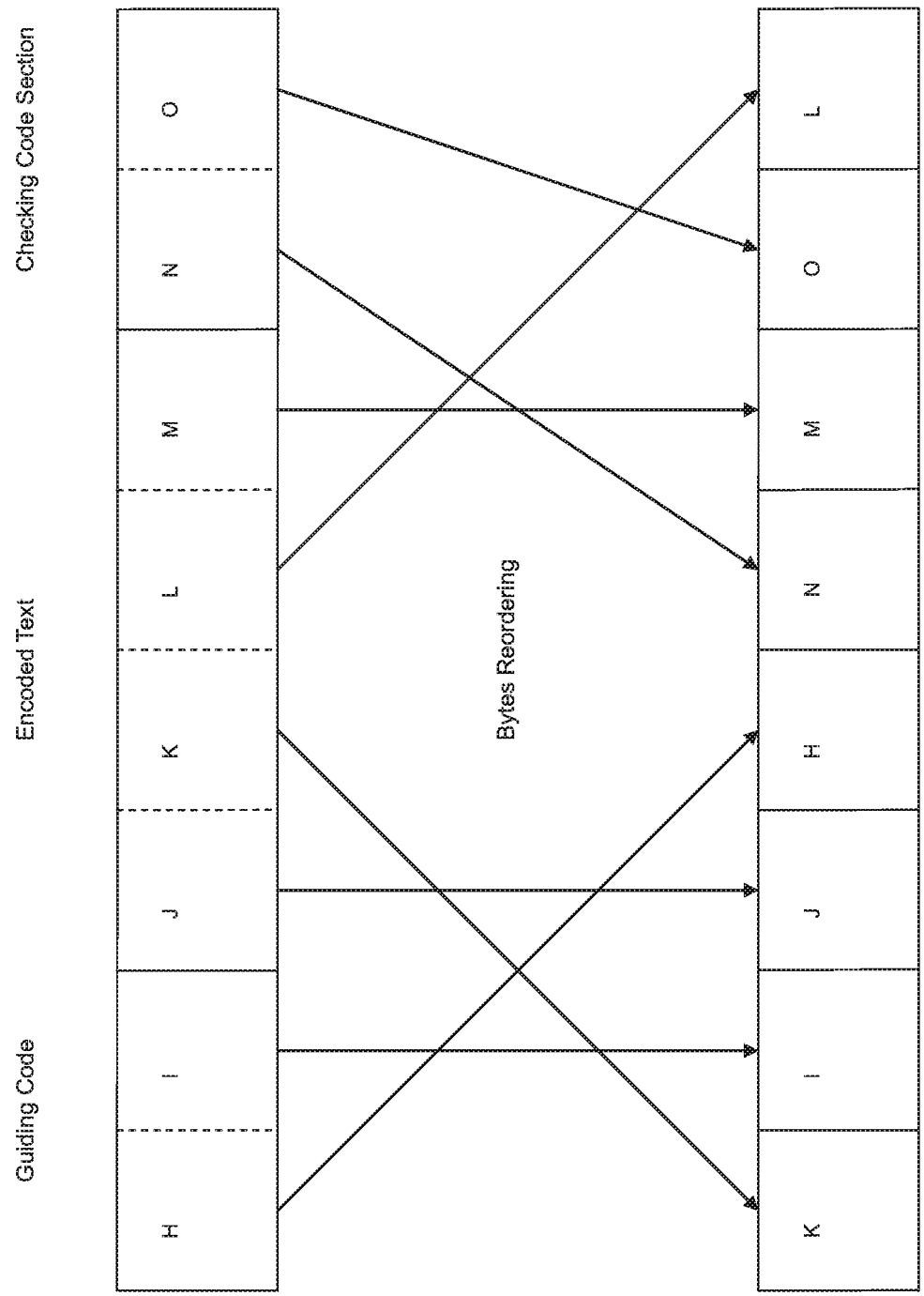
FIG. 10 shows an additional bytes reordering step for the semi-ciphertext according to one embodiment of the present invention.

FIG. 10 shows an additional bytes reordering step for the semi-ciphertext according to one embodiment of the present invention.

The bits of the semi-ciphertext may be reordered again before being encrypted by the standard encryption process (for example, AES). The rule for the reordering may be given based on the model of the terminal product 210 or the updating times of the usable time. Such a reordering increases the difficulty and reduces the possibility of deciphering.

Figure 11:
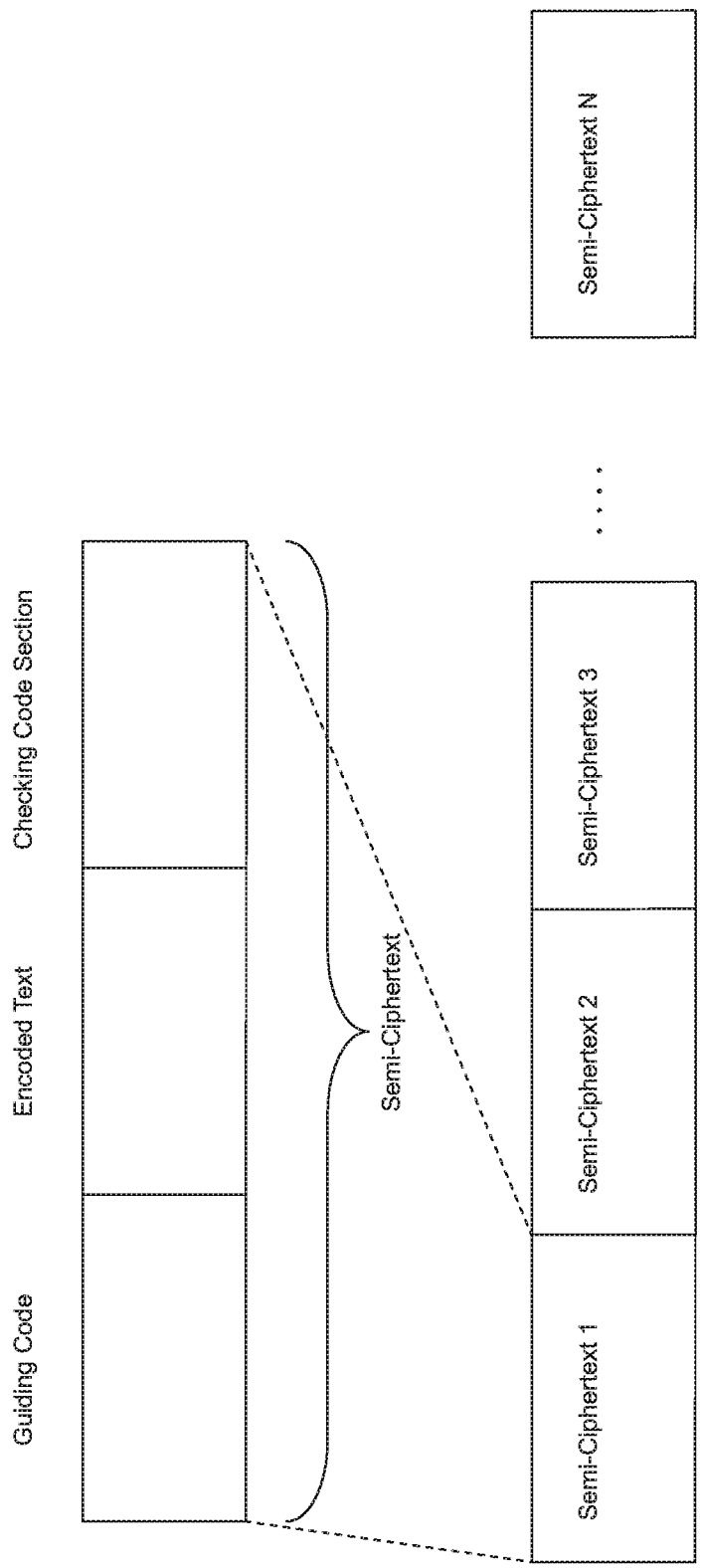
FIG. 11 shows a cascading step for the semi-ciphertexts according to one embodiment of the present invention.

FIG. 11 shows a cascading step for the semi-ciphertexts according to one embodiment of the present invention.

A series of semi-ciphertexts may derived by cascading a plurality of semi-ciphertexts in order to reach a required length. The series of the semi-ciphertexts may be reordered as well. The series of the semi-ciphertexts may be encrypted by the standard encryption process suitable for the required length. For example, the standard encryption process is 128-bit or 256-bit advanced encryption standard (AES), the series of the semi-ciphertexts may be encrypted into an AES-encrypted semi-ciphertext. Alternatively, a series of AES-encrypted semi-ciphertexts may be derived by cascading a plurality of ABS-encrypted semi-ciphertexts in order to reach a required length.

[Wi-Fi Module]

Figure 12:
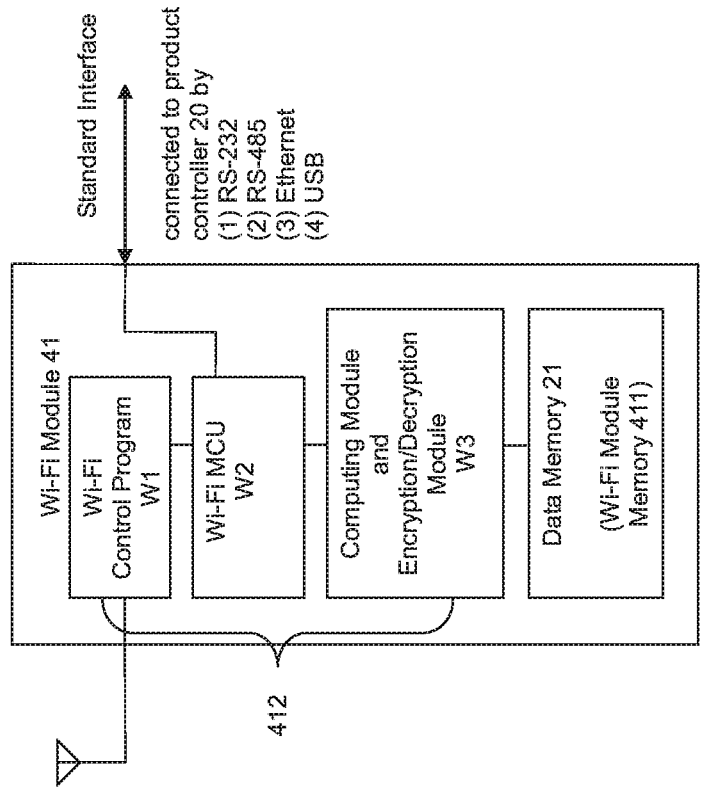
FIG. 12 shows the Wi-Fi module according to one embodiment of the present invention.

FIG. 12 shows the Wi-Fi module 41 according to one embodiment of the present invention.

The Wi-Fi module 41 includes a Wi-Fi module controller 412 (as shown in FIG. 4) and a data memory 21.

The Wi-Fi module controller 412 may include a Wi-Fi control program W1, a Wi-Fi microprocessor control unit (MCU) W2 and a unit including a computing module and an encryption/decryption module W3. The Wi-Fi control program W1 has a communication program for internet connection, and downlink standard interface communication program for RS-232, RS-485, Ethernet or USB connection to the terminal product 210. The Wi-Fi MCU W2 is used to control all functions. The unit including a computing module and an encryption/decryption module W3 is used to execute the usable time management process, in order to calculate, encrypt, and decrypt the usable time.

The usable time management process may be executed by Wi-Fi module controller 412. The usable time management process works in a similar way as in the product controller 20.

The standard encryption and decryption process and the private semi-ciphertext algorithm also refer to the case of the product controller 20.

The aforementioned Wi-Fi module 41 is an illustrative example suitable to the aforementioned fourth embodiment shown in FIG. 4.

[Usable Time Management System and Method]

The usable time management system and method according to the present invention are discussed with reference to FIGS. 13 to 15, while relevant components not shown in FIGS. 13 to 15 may be found in FIGS. 1 to 5.

The present invention provides a terminal product usable time management method, adapted to a terminal product usable time management device 2 shown in FIG. 5, which includes a data memory 21, a microprocessor 22, and at least one communication port 40 of a product controller 20.

The method includes the following steps:

(a) Using a customer service software 11 of a remote server 100 to generate, encrypt and send a new expiry date to the local apparatus 200;

(b) Using the data memory 21 to store an identifier and a usable time of the terminal product 210;

(c) Connecting the communication port(s) 40 to an external device, such as an Wi-Fi module 41, a USB flash drive 42 and/or an operating panel 43, in order to receive a new expiry date to update the usable time;

(d) Using the microprocessor 22 to read the encrypted usable time stored in the data memory 21, decrypt the encrypted usable time, decrease the usable time per time unit, encrypt the decreased usable time, store the encrypted and decreased usable time into the data memory 21, and instruct the product controller 20 to disable some or all functions of the terminal product 210, if the usable time is inaccessible or decreased to zero FIG. 13 is an overview flowchart of the usable time management method according to one embodiment of the present invention.

In the step R1, the staff enters new customer data (new customer's data or customer's new data).

In the step R2, the customer service software finds the intermedia code from the S/N, and then obtains the identifier from the intermedia code. The identifier is invisible to the staff. Besides, the terminal product 210 may have a system code, which may be associated with the encryption and the decryption. Different models or categories of terminal products may have different system codes.

In the step R3, the staff updates the customer data, and thus the expiry date of the terminal product 210 is also updated. The expiry date, the identifier and/or the system code participate in the encryption process of the semi-ciphertext algorithm in order to generate a semi-ciphertext. The identifier may be used in the following decryption process. For example, the standard decryption process may determine if the identifier in the received ciphertext is consistent with the identifier of the terminal product 210. If the identifier in the received ciphertext is inconsistent with the identifier of the terminal product 210, the standard decryption process will immediately stop the decryption process. This security mechanism may avoid a fake ciphertext. In order to achieve this security mechanism, in common cases, the identifier may be a tool participating in the standard encryption/decryption process. In other cases, the identifier may participate in other process for matching the ciphertext and the terminal product 210.

In the step R4, the customer service software generates the encrypted expiry date, i.e. the ciphertext, by the standard encryption process.

In the step R5, the customer service software sends the ciphertext via the secure sockets layer (SSL).

Then, there are at least three ways to send the ciphertext to the local apparatus 200.

The step R611 is to send the special ciphertext via a Wi-Fi Module 41. In the step 612, the product controller 20 decrypts the ciphertext from the Wi-Fi module to update the usable time.

The step R621 is to generate a text or binary codes from ciphertext for e-mail or printed letter, then send it to the user. In the step 622, the user has to enter the special binary code or text to the terminal product 210 to update the usable time.

The step R631 is to store the ciphertext into a USB flash drive 42, then send it to the user. Optionally, the user may download the ciphertext through his mobile device, then save it in the USB flash drive 42. In step 632, the product controller 20 decrypts the ciphertext from the USB flash driver 42 to update the usable time.

Finally, in the step R7, the user may activate the normal functions of the terminal product 210.

FIG. 14 is a flowchart of the terminal product usable time management method with internet according to one embodiment of the present invention.

If the internet is available, that is, in a circumstance that the communication port (40) is connected to the internet, the remote server 100 is configured to execute the following steps.

The step S1 is to launch a remote diagnostic system (RDS) or a customer management system (CMS).

The step S2 is to read an internet protocol (IP) address of the terminal product 210 or a registered identity (ID) of a mobile application (APP) of a user according to a serial number (S/N) of the terminal product 210.

The step S3 is to receive a request of updating the usable time or the expiry date.

The step S4 is to search the identifier of the terminal product 210 according to the S/N of the terminal product 210, encrypt the new expiry date into a semi-ciphertext by a semi-ciphertext algorithm, and encrypt the semi-ciphertext into a communication-ciphertext by a standard encryption process (for example, DES or AES) and the identifier.

The step S51 is to upload the communication-ciphertext to the internet, in order to send the communication-ciphertext to the terminal product 210, directly (S521) or indirectly (S522).

In the step S521, the communication-ciphertext is sent to the user APP, and then, in the step S522, it is further sent from the user APP to the product controller 20 in a P2P mode.

Accordingly, the terminal product usable time management device 2 is configured to execute the following steps.

The step S6 is to receive a communication-ciphertext from the communication port 40, decrypt the communication-ciphertext into a semi-ciphertext by a standard decryption process and the identifier; and decrypt the semi-ciphertext into the new expiry date by a semi-ciphertext algorithm to update the usable time;

In the step S7, the product controller 20 may activate the normal functions of the terminal product 210 if it has not expired according to usable time. Alternatively, in the step S8, the product controller 20 may disabling all or some functions of the terminal product 210 if it has expired according to usable time.

FIG. 15 is a flowchart of the terminal product usable time management method without internet according to one embodiment of the present invention.

If the internet is not available, that is, in a circumstance that the communication port 40 is not connected to the internet, the remote server 100 is configured to encrypt the new expiry date into a semi-ciphertext by a semi-ciphertext algorithm; and encrypt the semi-ciphertext into a text or binary codes having a specific length by a standard encryption process, referring to the step T1.

Then, there are at least three ways to send the text or binary codes to the terminal product 210.

In the step T211, the remote server 100 stores the text or binary codes into a USB flash drive 42. Then, in the step T212, the terminal product usable time management device 2 receives the text or binary codes stored in the USB flash drive 42 from the communication port 40. Then, in the step T3, the terminal product usable time management device 2 decrypts the text or binary codes into a semi-ciphertext by a standard decryption process, and decrypts the semi-ciphertext into the new expiry date by a semi-ciphertext algorithm to update the usable time.

Alternatively in the step T221, the remote server 100 divides the text or binary codes into groups to match number of keys on a keyboard of an operating panel 43 of the terminal product 210.

In the step T222A, for the keyboard with less than or exactly 10 keys, every 3 bits of the text or binary codes forms a group, the groups are arranged into a series of octal input-ciphertexts.

In the step T222B, for the keyboard with more than 10 keys and less then or exactly 16 keys, every 4 bits of the text or binary codes forms a group, the groups are arranged into a series of hexadecimal input-ciphertexts.

In the step T222C, for the keyboard with more than 16 keys, every specific bits of the text or binary codes forms a group, the groups are arranged into a series of input-ciphertexts.

Then, in the step T223, the terminal product 210 reads and transfers the divided text or binary codes into the text or binary codes.

The step T3 is also performed after the steps T222A, T222B or T222C.

Alternatively in the step T231, the staff receives a new expiry date data. Then, the staff enters a password from an operating panel 43 via the communication port 40 to enter an advance mode of the product controller 20, in order to update the usable time or the expiry date in the advance mode.

Finally, in the step T4, the user may activate the normal functions of the terminal product 210.

[Server End]

The server end, in particular, the customer management system (CMS) of the usable time management system will be discussed in the following description.

Generally, a machine (a terminal product) has a serial number (S/N). The serial number may correspond to an identifier. In another embodiment, the serial number may correspond to an intermediate code, known as a public key, at first, and then correspond to the identifier. The identifier may be saved in a secure location.

The customer data include the expiry date. The remote server 100 may find the customer data according to the serial number, and then extract (for example, search, read, and/or encrypt) the expiry date from the customer data. The expiry date may be encrypted to become a ciphertext by the encryption process and identifier. The ciphertext is sent to the terminal product 210 through a Wi-Fi module 41 or a USB flash drive 42. The product controller 20 decrypts the ciphertext into the expiry date by the decryption process and the identifier. Finally, a usable time is obtained from the expiry date, and used to launch the whole functions of the terminal product 210. (Herein, a usable time is used to extend the original usable time, or a remaining usable time is used to repair (restore) the missed or damaged usable time.)

In case that the main program is executed by the Wi-Fi module 41, the ciphertext is received and decrypted into the expiry date by the Wi-Fi module 41, and the usable time is obtained from the expiry date and then stored in a specific storage in the Wi-Fi module 41. The product controller 20 has to ask the Wi-Fi module 41 to confirm the usable time when the terminal product 210 is launched. The Wi-Fi module 41 will send an allowance to the product controller 20 for the user to use the whole functions of the terminal product 210 if the usable time has not expired.

The customer service software 11 of the remote server 100 is used to find the customer data according to the serial number, in order to obtain the identifier and the usable time, because the customer service software 11 only displays the serial number instead of the identifier for security purposes. In other words, the identifier is invisible on the customer service software 11.

In common cases, the identifier is generated when the terminal product 210 is just made out in the factory. The identifier is associated with the serial number, and the customer data includes the serial number, the customer telephone number and so on. Out of the factory, the identifier will not appear on the terminal product 210 anymore, and thus the identifier remains confidential to anyone, including the user.

The identifier of the product controller 20 of the terminal product 210 is hidden in security. In principle, only the serial number of the terminal product 210 can be found.

The identifier is also saved in the customer service software 11 or the customer database 12 of the remote server 100. In case that the identifier saved in the remote server 100 is found different from the identifier saved in the product controller 20, there may be an intermediate code (a public key) hiding the real identifier, which is saved in a secure location. In this case, the remote server 100 has to obtain the identifier according to the serial number, and then perform the encryption or the decryption by the standard encryption/decryption process and the identifier.

Therefore, the basic process and structure of the remote server 100 has been discussed.

By introducing the public key, a staff cannot see the identifier directly, and the staff can only use the serial number in the work.

The remote server 100 encrypts the expiry data by the semi-ciphertext algorithm according to the present invention. The encrypted data may seem to be a series of random numbers, even for the staff.

The identifier is generated with certain regularity. For security, such regularity has to be broken up by the private semi-ciphertext algorithm according to the present invention. In particular, the same identifier may be encrypted into different semi-ciphertexts in different times of encryptions.

[User End]

The user end of the usable time management system will be discussed in the following description.

In general, the product controller 20 saves the serial number, the identifier, and the usable time of the terminal product 210. However, the identifier is encrypted and saved in a secure location, and thus invisible. Only the serial number is visible.

When the product controller 20 receives a ciphertext from the remote server 100, the product controller 20 will decrypt the ciphertext, and operate with the decrypted data (for example, the usable time).

The main program of the product controller 20 may include an initialization process, a utility process, a communication process, a standard encryption/decryption process, an identifier access process, a usable time management process, and a semi-ciphertext algorithm. Preferably, obfuscation is applied to the standard encryption/decryption process, the identifier access process, the usable time management process and/or the semi-ciphertext algorithm to obfuscate the program codes of the aforementioned processes.

The usable time management process is performed after storing a non-zero usable time in the data memory.

In one embodiment, the terminal controller 20 may store the different random numbers of the ten sets of the successively received ciphertexts. If the terminal controller 20 receives a ciphertext with a random number the same as any of the stored ten different sets of random numbers, the received ciphertext will be abandoned (ineffective).

If the terminal product 210 has to repair (restore) the usable time because of maintenance or malfunction, the RDS, CMS or the remote server 100 will generate a remaining usable time by calculating the remaining days, encrypt the remaining usable time, and send the encrypted remaining usable time to the terminal product 210. The user can use the whole functions of the terminal product 210 for the remaining days after receiving, decrypting and storing the encrypted remaining usable time.

After storing the remaining usable time, the user can use the terminal product 210 until the usable time expires, even without the internet. Another way is to send an expiry date to the terminal product 210.

In order to prevent the user from illegally modifying the real time clock (RTC) to deceive the terminal product 210, or reusing the original expiry date, it is important to introduce a protective usable time management process.

The usable time is calculated based on the coordinated universal time (UTC). The usable time is encrypted and stored in a specific location in a data memory 21 after being downloaded to the local apparatus 200. The memory is designed to prevent data loss due to an interruption of power supply.

Normally, the RTC runs forward to the future. It forbids modifying the RTC backward to the past. The user can only adjust the RTC within a specific range, for example, one to two days. However, such an adjustment is further limited by the usable time. Therefore, the user cannot modify the RTC (for example, modify the RTC backward to the past) to extend the original usable time.

In conclusion, according to the present invention, the usable time is decreased with time, stored and protected in the data memory 21 of the local apparatus 200. Some or all functions of the terminal product 210 may be limited if the usable time expires. The present invention also provides a private semi-ciphertext algorithm to encrypt and decrypt the usable time for further use in the usable time management process, so that the usable time will not be extend by modifying the RTC.

Although the present invention has been explained in relation to its preferred embodiment, it is to be understood that many other possible modifications and variations can be made without departing from the spirit and scope of the invention as hereinafter claimed.

What is claimed is:

1. A terminal product usable time management method, adapted to a terminal product usable time management device including a data memory, a microprocessor, and at least one communication port of a product controller;
    the method comprising:
    using a customer service software of a remote server to generate, encrypt and send a new expiry date to a local apparatus;
    using the data memory to store an identifier and a usable time or an expiry date of the terminal product, wherein the usable time or the expiry date has been encrypted into an encrypted usable time or an encrypted expiry date;
    connecting the at least one communication port to at least one external device, in order to receive the new expiry date used to update the usable time or the expiry date stored in the data memory;
    using the microprocessor to read the encrypted usable time or the encrypted expiry date stored in the data memory, decrypt the encrypted usable time or the encrypted expiry date into the usable time or the expiry date, decrease the usable time per time unit into a decreased usable time or compare today's date with the expiry date, encrypt the decreased usable time into an encrypted and decreased usable time or encrypt the expiry date into the encrypted expiry date, store the encrypted and decreased usable time or the encrypted expiry date into the data memory, and instruct the product controller to disable some or all functions of the terminal product, if the usable time read by the microprocessor is inaccessible or decreased to zero, or today's date reaches the expiry date read by the microprocessor.

2. The terminal product usable time management method as claimed in claim 1, wherein, in a circumstance that the communication port is connected to the internet, the remote server is configured to:
    launch a remote diagnostic system (RDS) or a customer management system (CMS);
    read an internet protocol (IP) address of the terminal product or a registered identity (ID) of a mobile application (APP) of a user according to a serial number (S/N) of the terminal product;
    receive a request of updating the usable time or the expiry date;
    search the identifier of the terminal product according to the serial number (S/N) of the terminal product;
    encrypt the new expiry date into a semi-ciphertext by a semi-ciphertext algorithm;
    encrypt the semi-ciphertext into a communication-ciphertext by a standard encryption process including DES or AES and the identifier; and
    upload the communication-ciphertext to the internet.

3. The terminal product usable time management method as claimed in claim 2, wherein the communication-ciphertext uploaded to the internet is directly sent to the terminal product usable time management device, or indirectly transferred to the terminal product usable time management device from the mobile application (APP) of the user.

4. The terminal product usable time management method as claimed in claim 1, wherein, in a circumstance that the communication port is connected to the internet, the terminal product usable time management device is configured to:
    receive a communication-ciphertext from the communication port;
    decrypt the communication-ciphertext into a semi-ciphertext by a standard decryption process including DES or AES and the identifier; and
    decrypt the semi-ciphertext into the new expiry date by a semi-ciphertext algorithm to update the usable time.

5. The terminal product usable time management method as claimed in claim 1, wherein, in a circumstance that the communication port is not connected to the internet, the remote server is configured to:
    encrypt the new expiry date into a semi-ciphertext by a semi-ciphertext algorithm; and
    encrypt the semi-ciphertext into a text or binary codes having a specific length by a standard encryption process including DES or AES.

6. The terminal product usable time management method as claimed in claim 5, wherein the remote server is further configured to store the text or binary codes into a universal serial bus (USB) flash drive.

7. The terminal product usable time management method as claimed in claim 6, wherein the terminal product usable time management device is configured to:
    receive the text or binary codes stored in the universal serial bus (USB) flash drive from the communication port;
    decrypt the text or binary codes into a semi-ciphertext by a standard decryption process including DES or AES; and
    decrypt the semi-ciphertext into the new expiry date by a semi-ciphertext algorithm to update the usable time.

8. The terminal product usable time management method as claimed in claim 5, wherein the remote server is further configured to divide the text or binary codes into groups to match number of keys on a keyboard of an operating panel of the terminal product.

9. The terminal product usable time management method as claimed in claim 8, wherein
- for the keyboard with less than or exactly 10 keys, every 3 bits of the text or binary codes forms a group, the groups are arranged into a series of octal input-ciphertexts;
- for the keyboard with more than 10 keys and less then or exactly 16 keys, every 4 bits of the text or binary codes forms a group, the groups are arranged into a series of hexadecimal input-ciphertexts; or
- for the keyboard with more than 16 keys, every specific bits of the text or binary codes forms a group, the groups are arranged into a series of input-ciphertexts.

10. The terminal product usable time management method as claimed in claim 1, further comprising:
- receiving a new expiry date;
- entering a password from an operating panel via the communication port to enter an advance mode of the product controller; and
- updating the usable time or the expiry date in the advance mode.

* * * * *